United States Patent
Conley et al.

(10) Patent No.: US 6,810,998 B2
(45) Date of Patent: Nov. 2, 2004

(54) METHOD OF IMPROVING LUBRICATION SYSTEM PERFORMANCE

(75) Inventors: Paul G. Conley, St. Charles, MO (US); Thomas M. Arens, Florissant, MO (US)

(73) Assignee: Lincoln Industrial Corporation, St. Louis, MO (US)

(*) Notice: Subject to any disclaimer, the term of this patent is extended or adjusted under 35 U.S.C. 154(b) by 0 days.

(21) Appl. No.: 10/649,183

(22) Filed: Aug. 27, 2003

(65) Prior Publication Data

US 2004/0035641 A1 Feb. 26, 2004

Related U.S. Application Data

(62) Division of application No. 10/045,214, filed on Nov. 9, 2001, now Pat. No. 6,705,432.

(51) Int. Cl.[7] .............................................. F16N 27/00
(52) U.S. Cl. ...................................... 184/7.4; 184/39.1
(58) Field of Search ............................. 184/7.4, 29, 32, 184/34, 39, 39.1, 42, 45.1; 137/883, 884; 222/389, 444; 417/401, 226, 385, 388

(56) References Cited

U.S. PATENT DOCUMENTS

| | | | |
|---|---|---|---|
| 2,122,177 A | 6/1938 | Klein | |
| 2,141,022 A | 12/1938 | Rotter | |
| 2,155,250 A | 4/1939 | Barks | |
| 2,162,898 A | 6/1939 | Rotter | |
| 2,206,335 A | 7/1940 | Rotter et al. | |
| 2,283,638 A | 5/1942 | Klein et al. | |
| 2,292,294 A | 8/1942 | Rotter et al. | |
| 2,328,812 A | 9/1943 | Klein | |
| 2,358,719 A | 9/1944 | Klein | |
| 2,448,583 A | 9/1948 | Fox | |
| 2,627,320 A | 2/1953 | Rotter | |
| 2,637,413 A | 5/1953 | Fox et al. | |
| 3,013,633 A | 12/1961 | Rotter | |
| 3,609,066 A | 9/1971 | Wegmann | |
| 3,653,466 A | 4/1972 | Fujita et al. | |
| 3,664,462 A | 5/1972 | Smith, Sr. | |
| 3,715,013 A | 2/1973 | Lyth et al. | |
| 3,850,016 A | 11/1974 | Stofey et al. | |
| 3,958,725 A | 5/1976 | Reeve | |
| 3,995,717 A | 12/1976 | Kroffke | |
| 4,397,376 A | 8/1983 | Saretzky | |
| 4,494,913 A | 1/1985 | Keller | |
| 4,520,902 A | 6/1985 | Snow | |
| 5,293,959 A | 3/1994 | Kimberlin | |
| 6,142,393 A | 11/2000 | Kotyk | |

OTHER PUBLICATIONS

Lincoln Industrial "Centro–Matic® Automated Lubrication Systems", 1999, pp. 1–6, Front cover and back page, St. Louis, Missouri.

Primary Examiner—Marcus Charles
Assistant Examiner—Timothy McAnulty
(74) Attorney, Agent, or Firm—Senniger Powers

(57) ABSTRACT

A method of improving performance of an existing lubrication system by use of one or more lubricant injector having a measuring chamber, venting of the injector involving transmission of lubricant from its inlet to the measuring chamber. A method of operation of the injector involves such transmission. Systems embodying one or more of such injectors may include an injector/connector assembly, and an injector sealing assembly.

4 Claims, 19 Drawing Sheets

METHOD OF IMPROVING LUBRICATION SYSTEM PERFORMANCE

CROSS-REFERENCE TO RELATED APPLICATION

This application is a division of application Ser. No. 10/045,214, filed Nov. 9, 2001 now U.S. Pat. No. 6,705,432.

BACKGROUND OF THE INVENTION

This invention relates to lubricant injection, more particularly a lubricant injector, a method of operation thereof, a lubricant injector system embodying the injector of the invention, a method of improving the performance of existing lubricant injector systems, and an injector/connector assembly.

The invention is especially concerned with a lubricant injector for use in a single-line lubrication system, a method of operation of the injector, a single-line system embodying one or more lubricant injectors, a method of improving the performance of existing systems, and an injector/connector assembly. The term "connector" as used herein means the structure, such as a manifold or a single-outlet means for connecting a plurality of injectors or a single injector with a lubricant supply line.

The invention involves a major improvement in an extensive series of injectors, lubricant injector systems and injector/connector assemblies developed by predecessors of the assignee of this invention, Lincoln Industrial Corporation of St. Louis, Mo., going back as far as 1937, reference being made to the following U.S. patents tracing the development:

| U.S. Pat. No. | Issue Date | Title |
| --- | --- | --- |
| 2,122,177 | Jun. 28, 1938 | Injector |
| 2,141,022 | Dec. 20, 1938 | Lubricating Apparatus |
| 2,155,250 | Apr. 18, 1938 | Injector |
| 2,162,898 | Jun. 20, 1939 | Relief Device For Lubricating Apparatus |
| 2,206,335 | Jul. 02, 1940 | Lubricating Apparatus |
| 2,283,638 | May 19, 1942 | Injector |
| 2,292,294 | Aug. 04, 1942 | Relief Valve |
| 2,328,812 | Sep. 07, 1943 | Venting Apparatus |
| 2,358,719 | Sep. 19, 1944 | Injector Valve Packing |
| 2,448,583 | Sep. 07, 1948 | Lubricant Injector |
| 2,627,320 | Feb. 03, 1953 | Lubricating System |
| 2,637,413 | May 05, 1953 | Lubricant Injector |
| 3,013,633 | Dec. 19, 1961 | Lubricant Injector |
| 3,609,066 | Sep. 28, 1971 | Lubricant Injection System |

Of special note are two prior injectors sold by Lincoln Industrial Corporation (and its predecessor), namely, injectors sold under the trademarks Series SL-1 and SL-32. While these prior injectors have been quite satisfactory in many lubrication system installations, they have the characteristic of being slow to vent for recharging of the injectors for the next dispensing cycle, especially when, for example, the line for supplying the lubricant is relatively long and/or the lubricant is viscous, as during cold weather. Venting (recharging) time may be as high as five hours or more for prior injectors. Further, the SL-1, SL-32 and other prior injectors which are assembled with a supply manifold (the connector) have the characteristic of requiring disconnection of the lubricant line servicing the injectors prior to removal of an injectors or injectors from the manifold for inspection or replacement, and re-connection of the lubricant line following the assembly of the inspected or replacement injector(s) with the manifold.

BRIEF SUMMARY OF THE INVENTION

Among the several objects of the invention may be noted the provision of a lubricant injector which, while requiring venting for recharging, vents substantially faster than prior injectors such as the SL-1 and SL-32 injectors, and a method of operation of the injector bringing about the faster venting; the provision of such an injector, the construction and the manufacture of which are no more involved than the construction and manufacture of prior injectors such as the SL-1 and SL-32 injectors; the provision of a centralized lubrication system which may include prior injectors such as the SL-1 and SL-32 injectors, wherein all injectors, including said prior injectors, vent substantially faster than prior systems; the provision of a method of revamping existing systems, which include slower-venting injectors such as the SL-1 and SL-32 injectors, to improve the system's performance by substantially reducing the venting and recharging time; and the provision of an injector/connector assembly, including an injector/manifold assembly, enabling the removal of an injector from the connector or manifold for inspection or replacement without requiring disconnection of the lubricant supply lines servicing the connector/manifold or the feed lines to the point(s) of lubrication, and reconnection thereof following the assembly of the inspected or replacement injector with the connector or manifold.

In addition to the above advantages, an injector of the present invention has the beneficial affect of enabling a substantial reduction in diameter of the piping or lubricant hose lines used in a centralized lubrication system, with attendant reduction in cost, and a substantial reduction in the work load of the pump incorporated in the system, with their attendant economies, including longer pump life.

The injector of the present invention is also designed for effective sealing against leakage of lubricant from the injector at high or low pressures.

In general, a lubricant injector of the invention comprises a body having an inlet for lubricant under pressure, an outlet, a measuring chamber for receiving lubricant from the inlet, and a piston movable through a stroke in the measuring chamber for the discharge of a measured volume of lubricant from the measuring chamber and thence through the outlet. Further, it has a valve responsive to pressure conditions in the inlet for operation of the injector in cycles in each of which the injector starts in a state of repose wherein pressure of lubricant in the inlet is relieved and the measuring chamber is charged with lubricant, progresses through a state for the discharge and ends in a state for venting for the recharging of the measuring chamber involving the transmission of lubricant from the inlet to the measuring chamber.

The method of operation generally involves the operation in cycles of a lubricant injector comprising a body having an inlet for lubricant under pressure, an outlet, a measuring chamber for receiving lubricant from the inlet, a piston movable through a stroke in the measuring chamber for the discharge of a measured volume of lubricant from the measuring chamber and thence through the outlet, and a valve responsive to pressure conditions in the inlet. Each cycle starts with the injector in a state of repose wherein the pressure of lubricant in the inlet is relieved and the measuring chamber is charged with lubricant. Pressure in the inlet is increased for actuating the valve placing the injector in a state for the discharge. Each cycle ends with relieving pressure in the inlet placing the injector in a state for venting for recharge of the measuring chamber involving the transmission of lubricant from the inlet to the measuring chamber.

A lubrication system of the invention comprises a plurality of injectors each operable through a cycle upon being supplied with lubricant under pressure to deliver a volume of lubricant and upon relief of pressure to recharge, and a system for supplying the injectors with lubricant under pressure for delivery of said volume and for venting the injectors for recharging. At least one of the injectors comprises an injector of the present invention, as described above.

The method of the invention is for improving the performance of an existing lubrication system of the type comprising a plurality of injectors each operable through a cycle upon being supplied with lubricant under pressure to deliver a volume of lubricant and upon relief of pressure to recharge, and a system for supplying the injectors with lubricant under pressure for delivery of said volume and for venting the injectors for recharging. Generally, the method comprises replacing one of the injectors of the existing system with an injector of the present invention, as set forth above.

A lubricant injector/connector assembly of the invention generally comprises a connector comprising a body having an injector-engaging face, and an injector comprising an elongate body having a face engaging said face of the connector and detachably fastened thereto. The injector has an inlet constituted by a chamber in the injector body adjacent one end thereof and an inlet passage extending from said face of the injector to said inlet chamber. The injector has an outlet constituted by an outlet passage extending from within the injector body to said face of the injector intermediate the said inlet passage and the other end of the injector body. The connector body has lubricant supply passaging therein in communication at said faces with said inlet passage. The connector body further has lubricant outlet passaging therein in communication at said faces with the outlet passage of the injector.

Another aspect of the present invention involves a sealing assembly for a lubricant injector comprising a body containing a reciprocal piston for dispensing lubricant from the body, and a pin connected to the piston and extending endwise from the body through an opening in the body. The sealing assembly is located in the opening surrounding the pin for sealing against leakage of lubricant from the body along the pin. The sealing assembly comprises a low-pressure annular sealing member having an inner edge in sliding sealing contact with the pin and an outer edge in sealing contact with a surface of the body at least partially defining said opening, the low-pressure sealing member being effective for sealing at low pressures, and a high-pressure annular sealing member having an inner surface in sliding sealing contact with the pin and an outer surface in sealing contact with said surface of the body, the high-pressure sealing member being effective for sealing at pressures higher than the low-pressure sealing member.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF PREFERRED EMBODIMENTS

Figure 1:
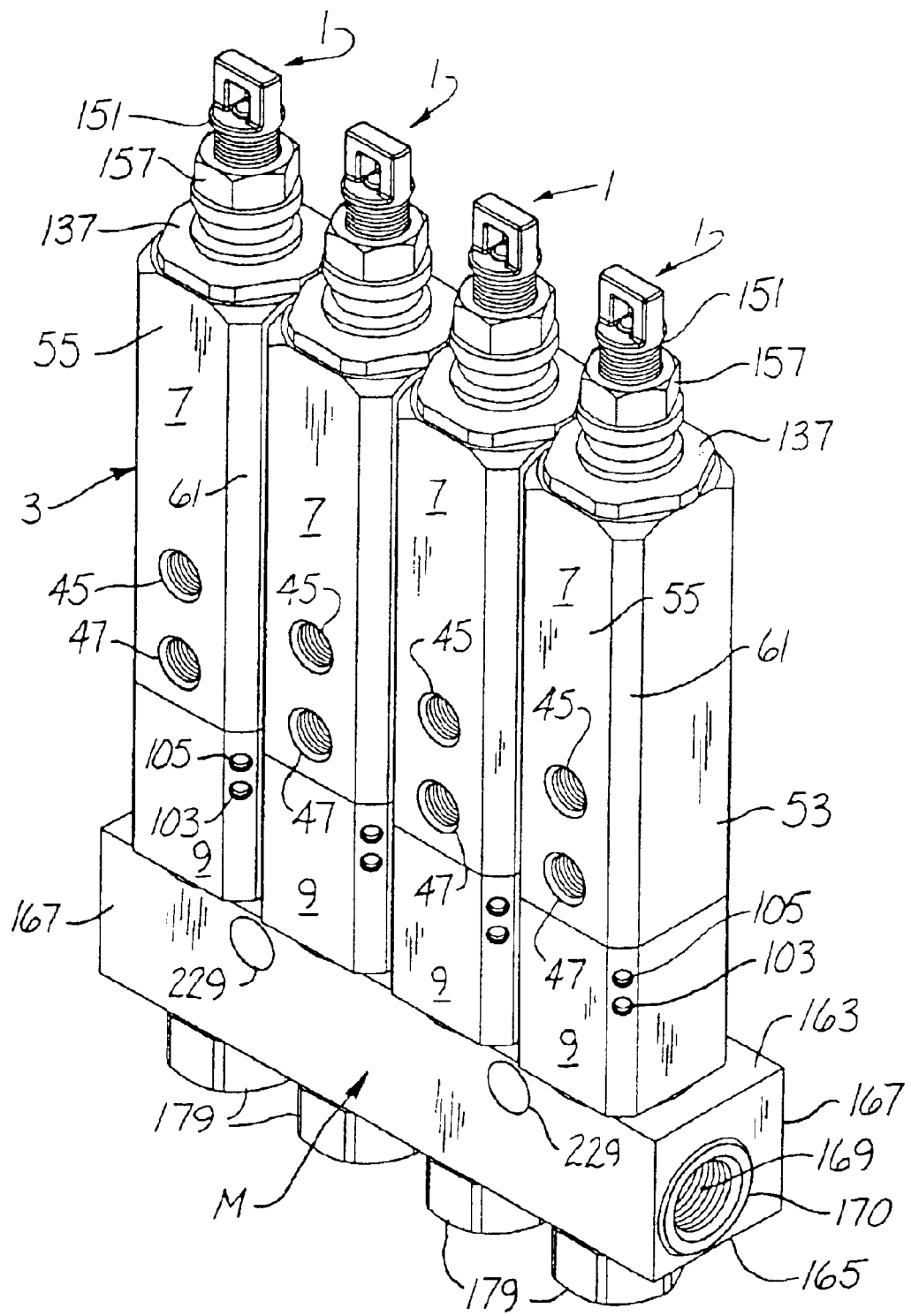
FIG. 1 is a perspective view of a bank of injectors of this invention on a manifold (the connector)
Figure 2:
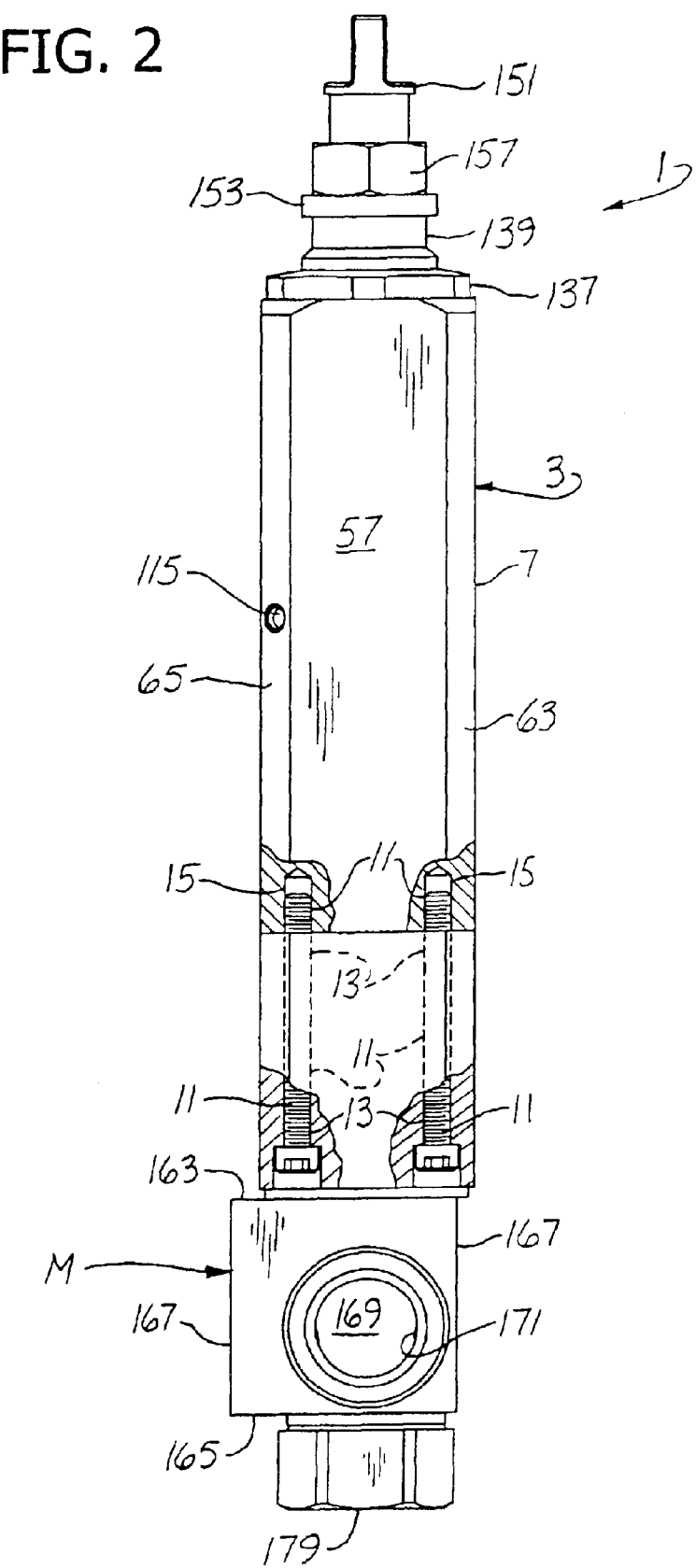
FIG. 2 is a view in elevation of the left end of FIG. 1 on a larger scale than FIG. 1.
Figure 3:
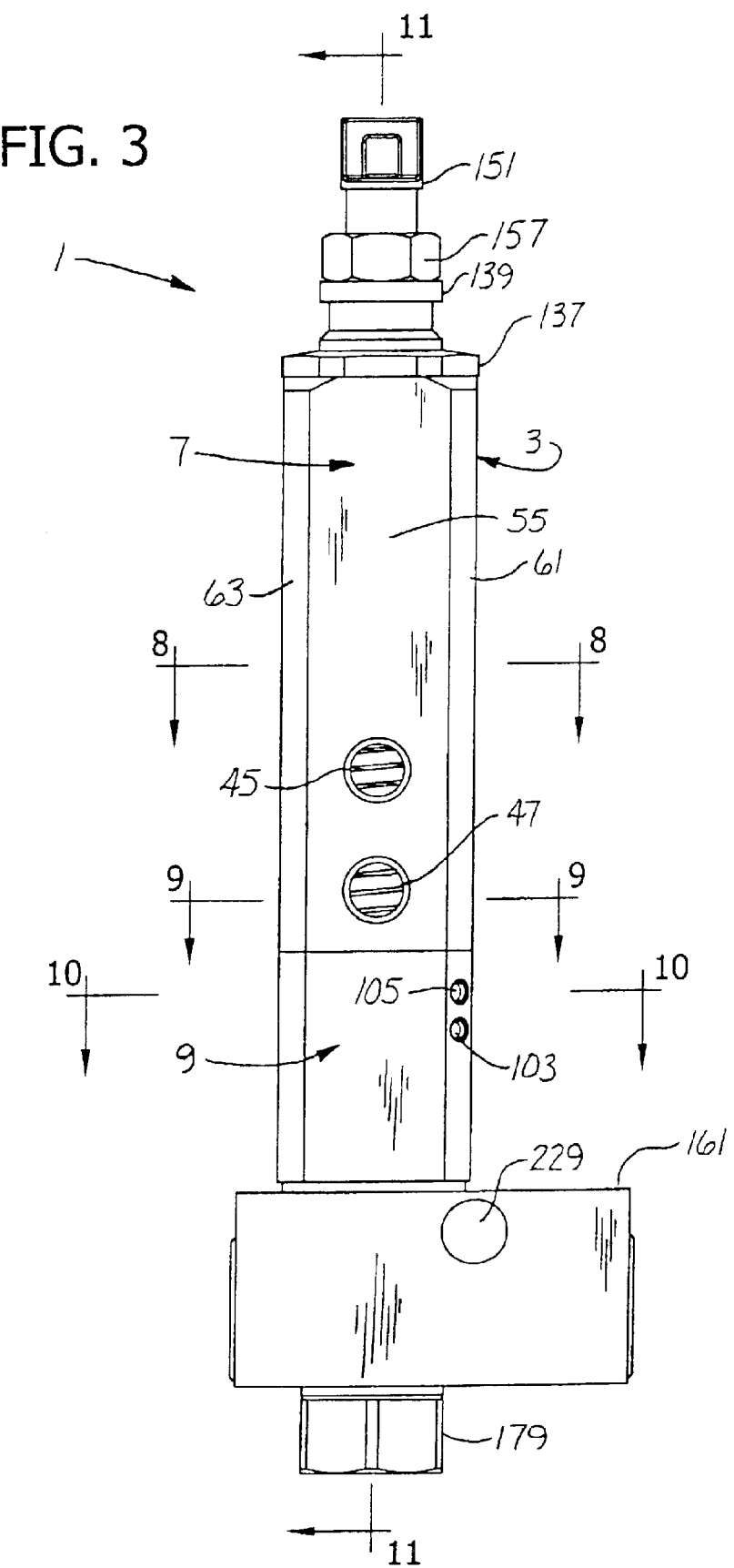
FIG. 3 is a view in front elevation of one of the injectors shown in FIG. 1 on a single-outlet connector.
Figure 10:
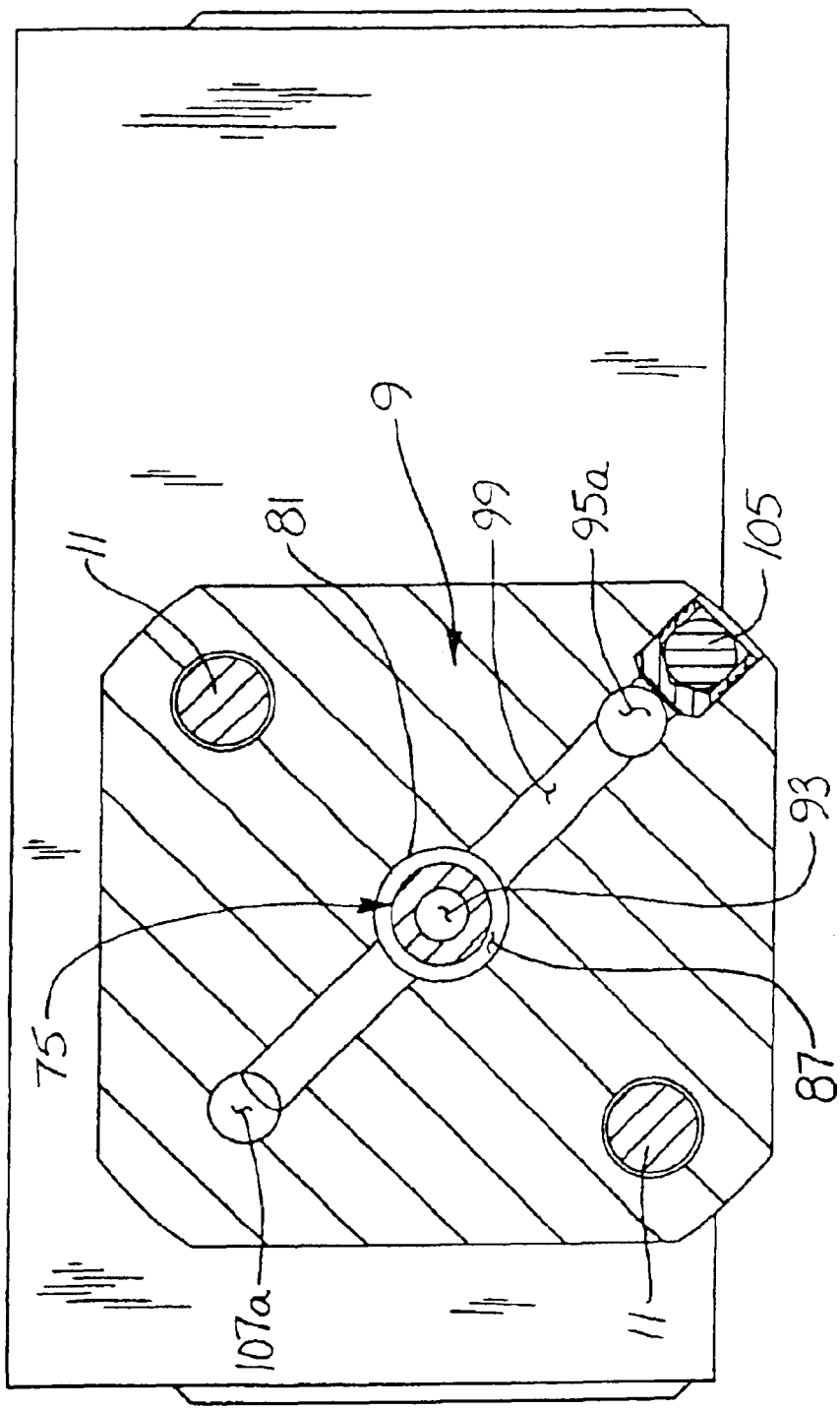
Figure 11:
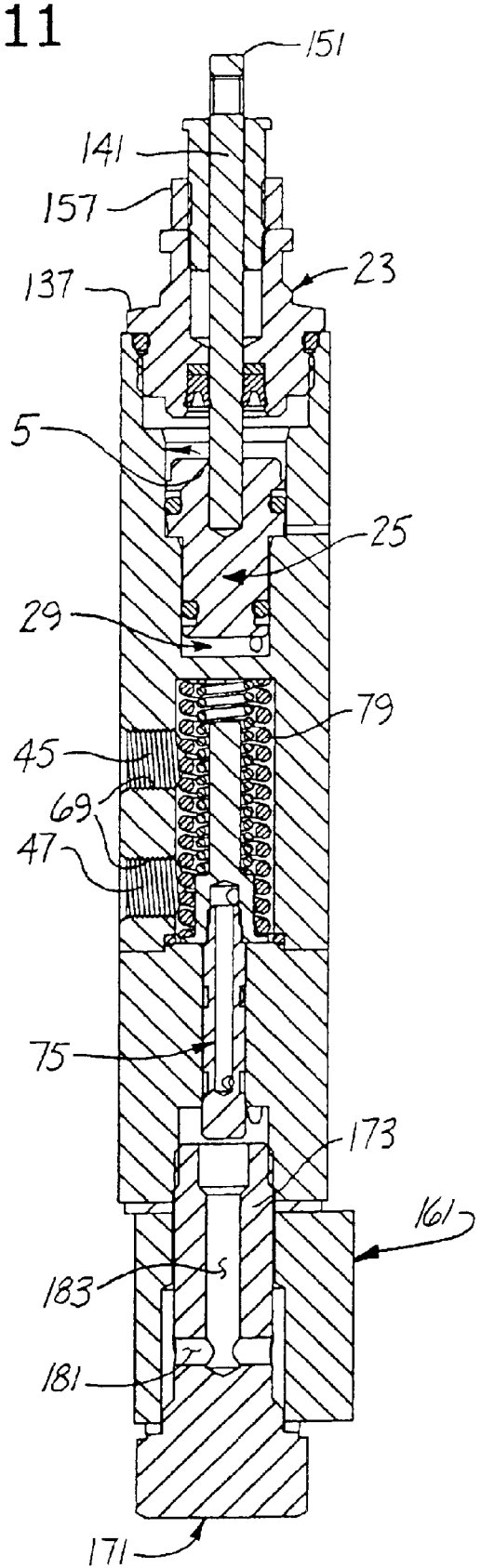
FIG. 11 is a view in vertical section taken generally on line 11—11 of FIGS. 3 and 9 on the scale of FIG. 3.

Referring to FIG. 1 of the drawings, there is shown a bank of injectors 1 of this invention (four being shown) on a manifold M for delivery of lubricant under pressure to and venting of lubricant pressure from the injectors. Each injector 1 comprises an elongate body 3 having a differential cylinder 5 therein (see FIGS. 4–7) on its longitudinal axis A adjacent one end of the body (its upper end as shown). In the particular embodiment shown, the body 3 is a two-piece body, comprising an upper part 7 surmounting a lower part 9 fastened together by relatively long screws 11 (see FIGS. 2 and 10) extending up through holes 13 in the lower part threaded at their upper ends in tapped holes 15 in the lower end of the upper part. The upper part 7 of the body has a bore 17 and first and second counterbores 19 and 21 extending in (down as shown in FIG. 4A) from the upper end thereof on axis A, the bore 17 and first counterbore 19 (having a larger diameter and thus a larger cross-sectional area than bore 17) forming the differential cylinder 5. The latter is closed at its upper end by a plug 23 threaded in the second counterbore 21. At 24 (see FIG. 4A) is indicated a forward-facing shoulder at the forward end of bore 17 constituting the first section (lower) of the differential cylinder and at the rearward end of bore 19 constituting the second (upper) section of the differential cylinder.

Figure 4:
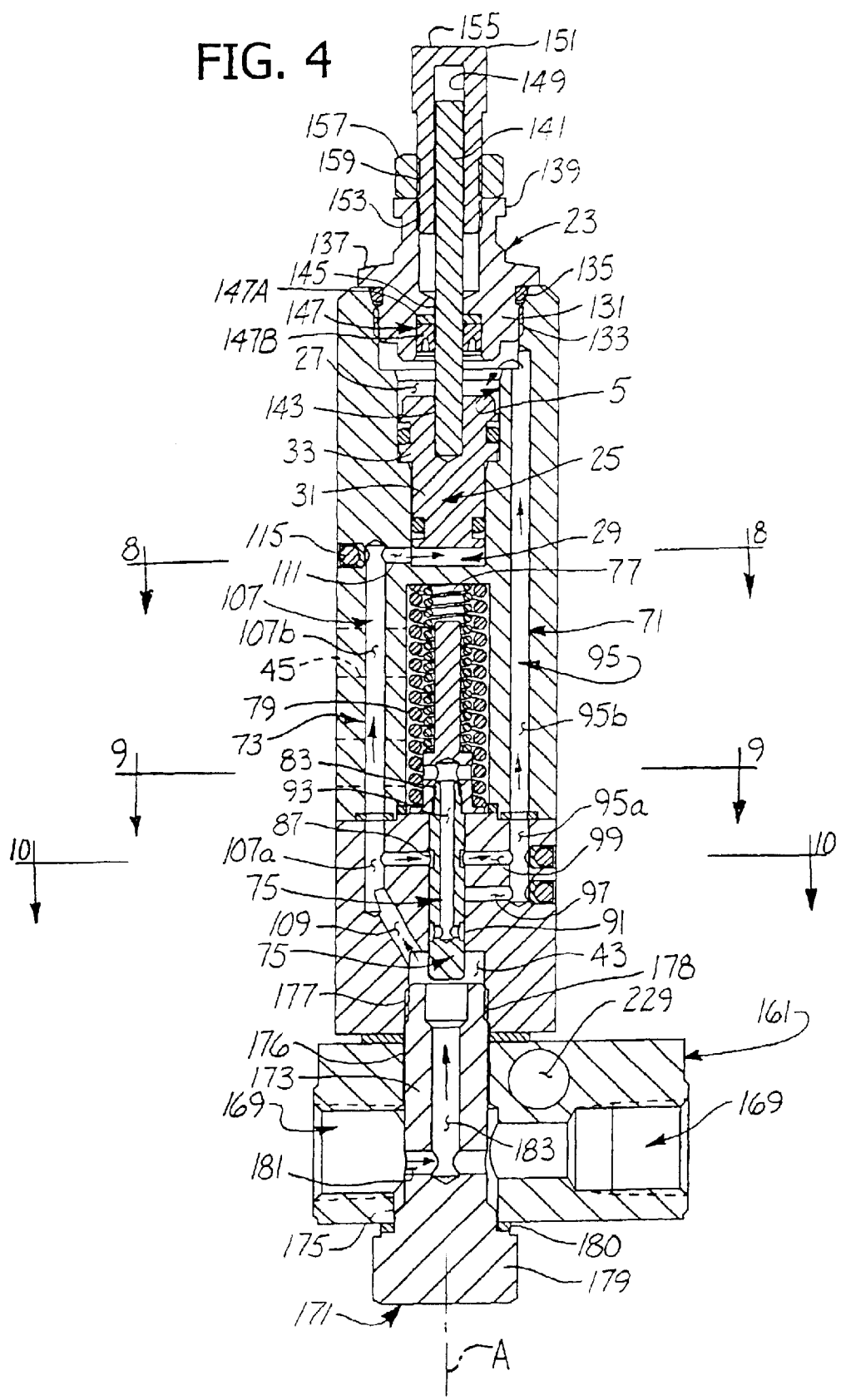
FIG. 4 is a view in vertical section of the injector in a first state, taken generally on line 4—4 of FIG. 10, on a single-injector connector.
Figure 4A:
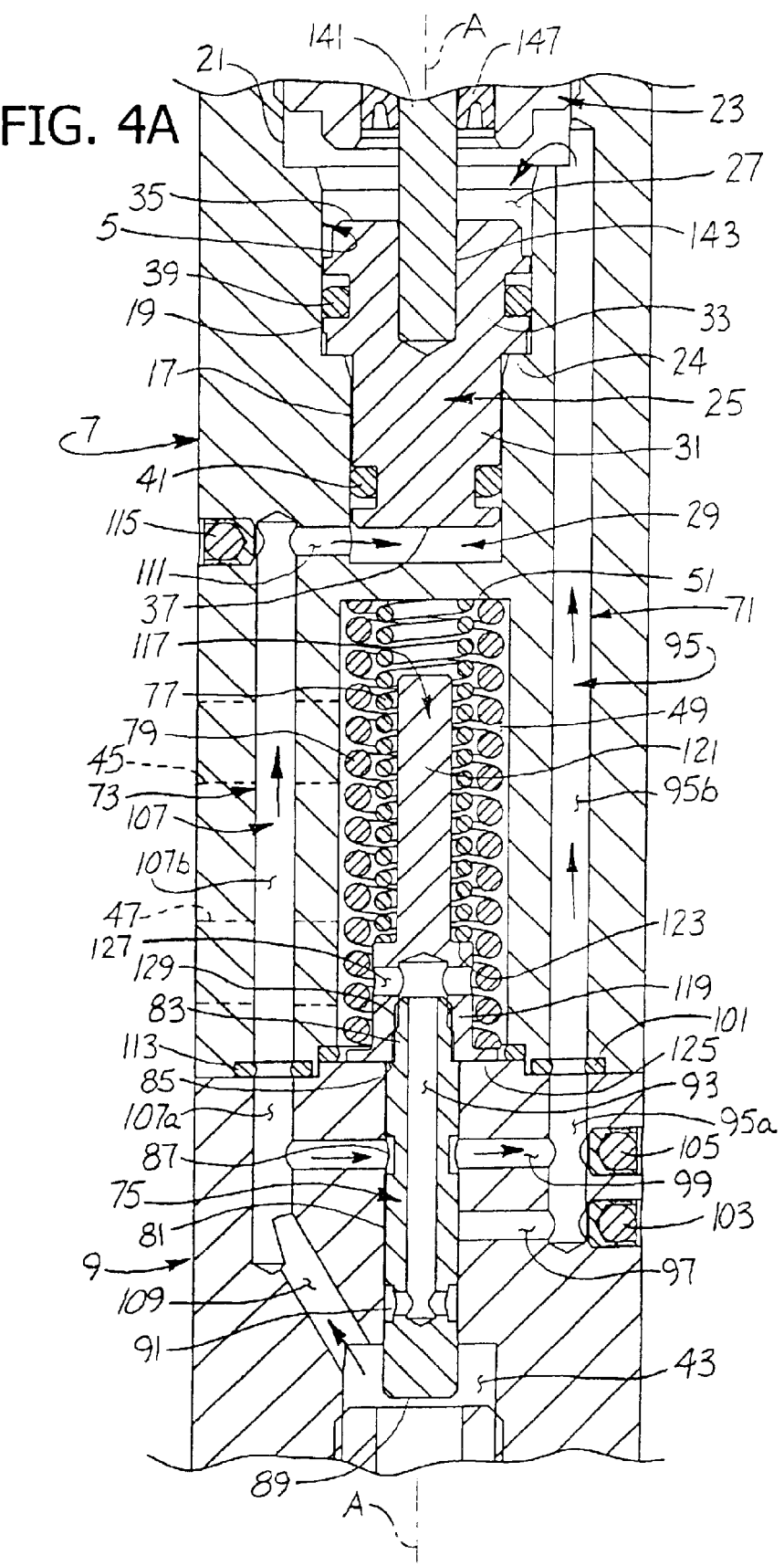
FIG. 4A is an enlarged fragment of FIG. 4.
Figure 6:
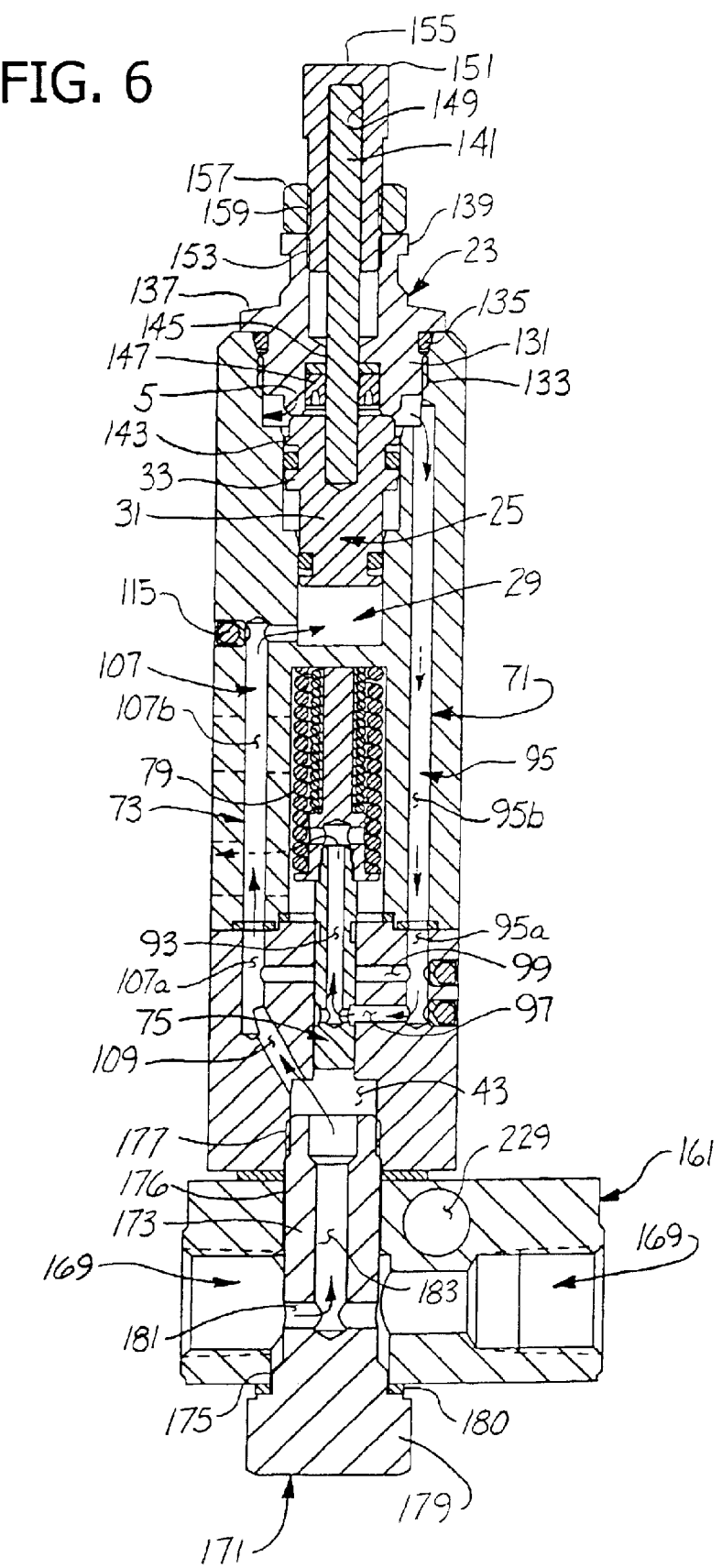
Figure 7:
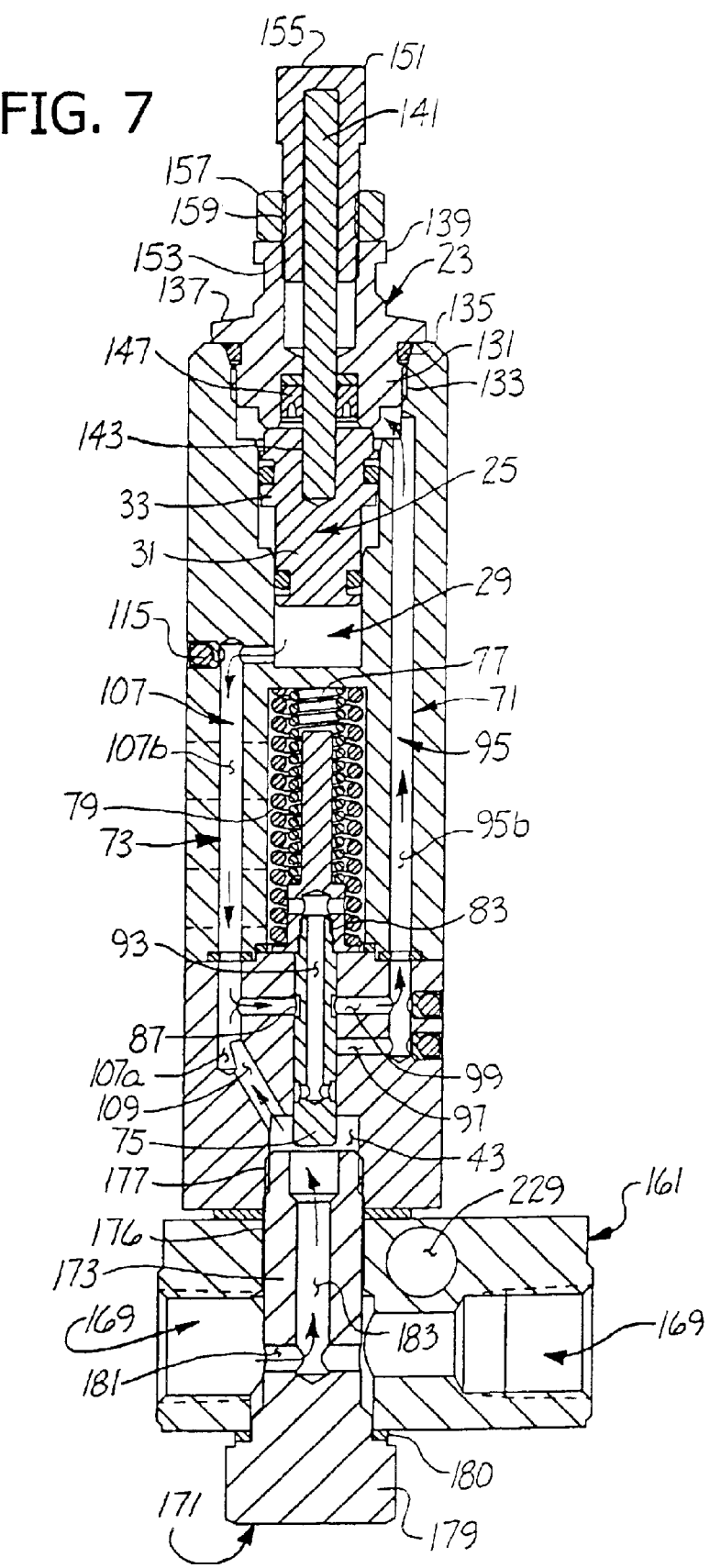

A differential piston generally designated 25 is slidable upward (which is forward) in the differential cylinder 5 from a retracted position engaging shoulder 24 in which it is illustrated in FIGS. 4 and 4A and in which it establishes a measuring chamber 27 for lubricant on the upper (forward) side of the piston, to an extended position in which it is illustrated in FIGS. 6 and 7 for discharging a measured volume of lubricant, the differential cylinder providing a pressure chamber 29 on the rearward (lower) side of the piston. In one embodiment (e.g., FIG. 4A), the differential piston 25 has a lower part 31 (its first section) sealingly slidable in the bore 17 (the first section of the differential cylinder) and an upper part 33 (its second section) of larger diameter than the lower part 31 sealingly slidable in the counterbore 19 (the second section of the differential cylinder), the area of the upper (forward) face 35 of the piston being larger than the area of the lower (rearward) face 37. Sealing rings for the piston parts are indicated at 39 and 41. The injector 1 is operable in cycles for discharging a measured volume of lubricant from the chamber 27 and subsequently recharging (reloading) the chamber, as will be described hereinafter.

The body 3 has an inlet 43 for lubricant under pressure constituted by a bore in its lower part 9 extending up from the lower end of the lower part 9 of the body and two outlets 45 and 47 (see FIGS. 1, 3, 9 and 11) extending laterally from a chamber 49 (the "discharge chamber") in the upper part 7 of the body extending axially upward in the upper part 7 from its lower end. In the preferred embodiment, the upper end 51 of this chamber 49 is somewhat below the lower end of the differential cylinder 5, although this is not critical. One of the two outlets 45, 47 may be plugged and thus deactivated, or both may be used as will be subsequently explained.

In one embodiment, the body 3 is of generally square outline in transverse cross-section (each part 7 and 9 of the body being of such cross-section and matching one another in transverse cross-section), having four rectangular sides 53, 55, 57 and 59 with beveled edges 61, 63, 65, 67. The outlets 45, 47 are constituted by holes drilled in from side 55 of the upper part 7 of body 3 to the discharge chamber 49, thus extending from chamber 49 to the side 55 (see FIG. 9), each hole being tapped (screw-threaded) as indicated at 69 (FIGS. 9 and 11) for connection of a lubricant delivery line or reception of a plug to close it off.

The body 3 has lubricant passaging therein including primary passaging designated 71 (FIG. 4) for transmission of lubricant under pressure from the inlet 43 to the measuring chamber 27 for loading the measuring chamber 27 with lubricant under pressure, and for transmission of lubricant under pressure from the measuring chamber to the one outlet 45 or 47 in use or both outlets (if both are used) for discharging a measured volume of lubricant. The lubricant passaging in the body further includes auxiliary passaging designated 73 for transmission of lubricant under pressure from the inlet 43 to the pressure chamber 29 under the piston 25. A valve 75 located in the region of the body 3 between the differential cylinder and the inlet end of the body is movable in the body between a first position (FIGS. 4, 4A and 7) in which it opens passaging 71 for loading the measuring chamber 27 and blocks passaging 71 from discharging lubricant from the measuring chamber 27 and a second position (FIGS. 5 and 6) in which it blocks passaging 71 against loading the measuring chamber 27 and opens the passaging 71 for discharging lubricant from the measuring chamber 27, all as will be subsequently detailed. The valve 75 is responsive to pressure in the inlet 43 and is subject to the bias of springs 77 and 79 for moving it from its said second position (FIGS. 5 and 6) to its said first position (FIGS. 4, 4A and 7). As will be described later in greater detail, the valve is also subject to back pressure of lubricant in the one outlet 45 or 47 in use or both outlets 45, 47, if both are in use, for moving it from its stated second position (FIGS. 5 and 6) to its first position (FIGS. 4, 4A and 7), being movable from its first position to its second position in response to cycle-initiating increase of pressure in inlet 43 and back from its second position to its first position under the spring bias plus said back pressure upon venting (relief) of lubricant inlet pressure. In the embodiment illustrated, the valve 75 is a slide valve constituted by a cylindric member sealingly slidable in a bore 81 in the lower part 9 of the body 3 extending on the axis A of the body between the upper end of the lower part 9 and the lubricant inlet 43 in part 9. The valve is longer than the bore. It has an upper end portion 83 of reduced diameter providing an upwardly facing annular shoulder 85. Below the shoulder it has an annular groove 87 and below that and adjacent its lower end 89 it has radial ports 91 establishing communication with an axial passage 93 in the valve extending up from the radial ports 91 to the upper end of the valve.

Primary passaging 71 comprises, in the illustrated embodiment, an elongate vertical passage designated 95 in its entirety extending lengthwise of the body 3 generally adjacent and parallel to the bevel 61 between a lower horizontal (transverse) passage 97, which may be referred to as the first horizontal passage or discharge passage, in the lower part 9 of the body and measuring chamber 27 in the upper part 7 of the body, intersecting an upper horizontal (transverse) passage 99, referred to as the second horizontal passage, in the lower part 9 just above the lower horizontal passage 97. The vertical passage 95, which constitutes a dual charging and discharging passage, is formed by drilling a relatively short hole 95a in the lower part 9 down from the upper end of the lower part and drilling a relatively long hole 95b in the upper part 7 up from the lower end of the upper part before assembly of the upper and lower parts, these holes being aligned in the assembly of the upper and lower parts 7, 9 to constitute passage 95 with an O-ring seal 101 at the junction of the parts. The horizontal passages 97, 99 are formed by drilling holes to constitute said passages 97, 99 in from the bevel 61 and plugging the outer end of each of the holes as indicated at 103 and 105.

Figure 8:
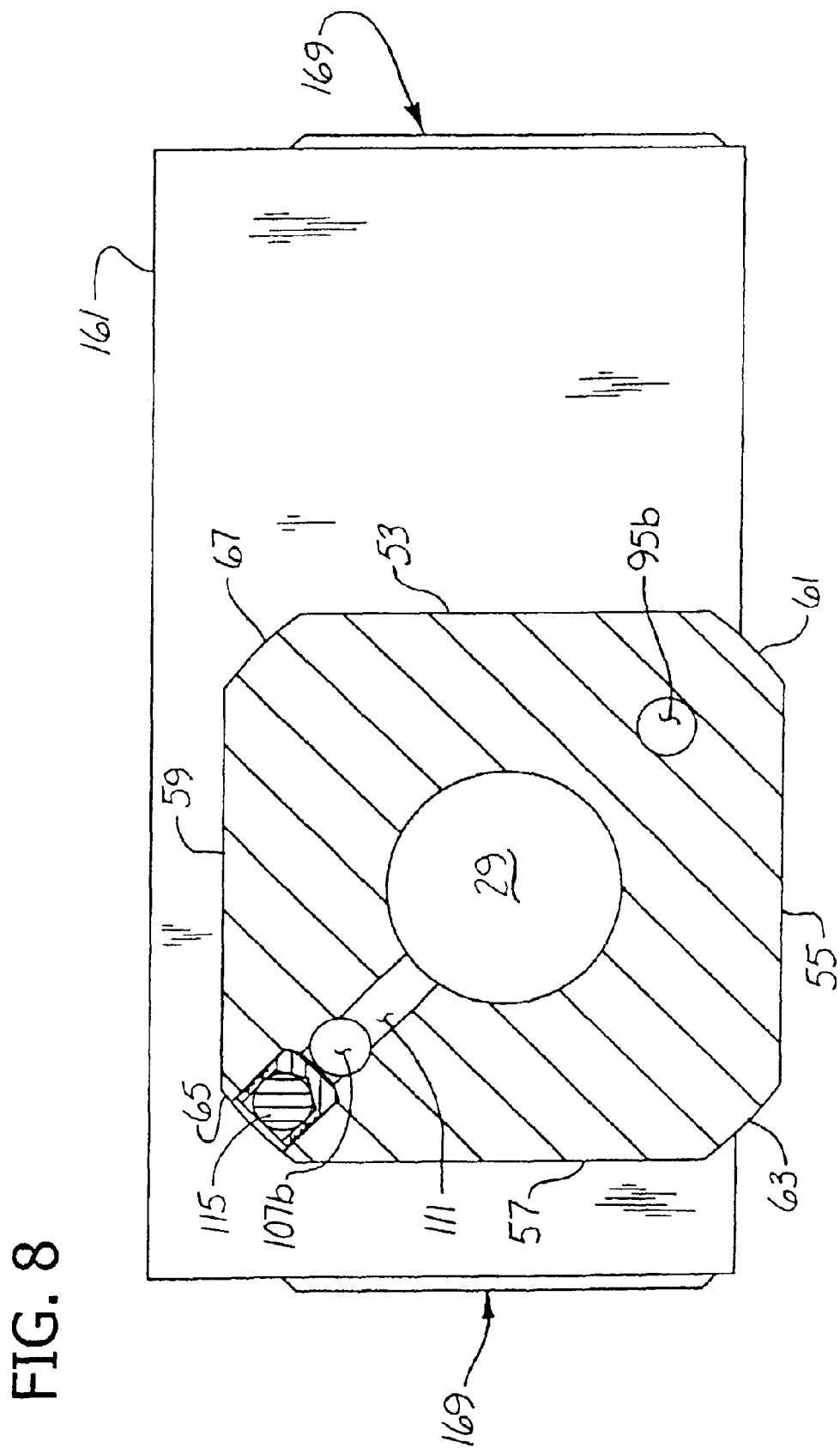
FIGS. 8, 9 and 10 are views in horizontal (transverse) cross-section taken generally on lines 8—8, 9—9 and 10—10, respectively, of FIG. 3 on a larger scale than FIG. 3.
Figure 9:
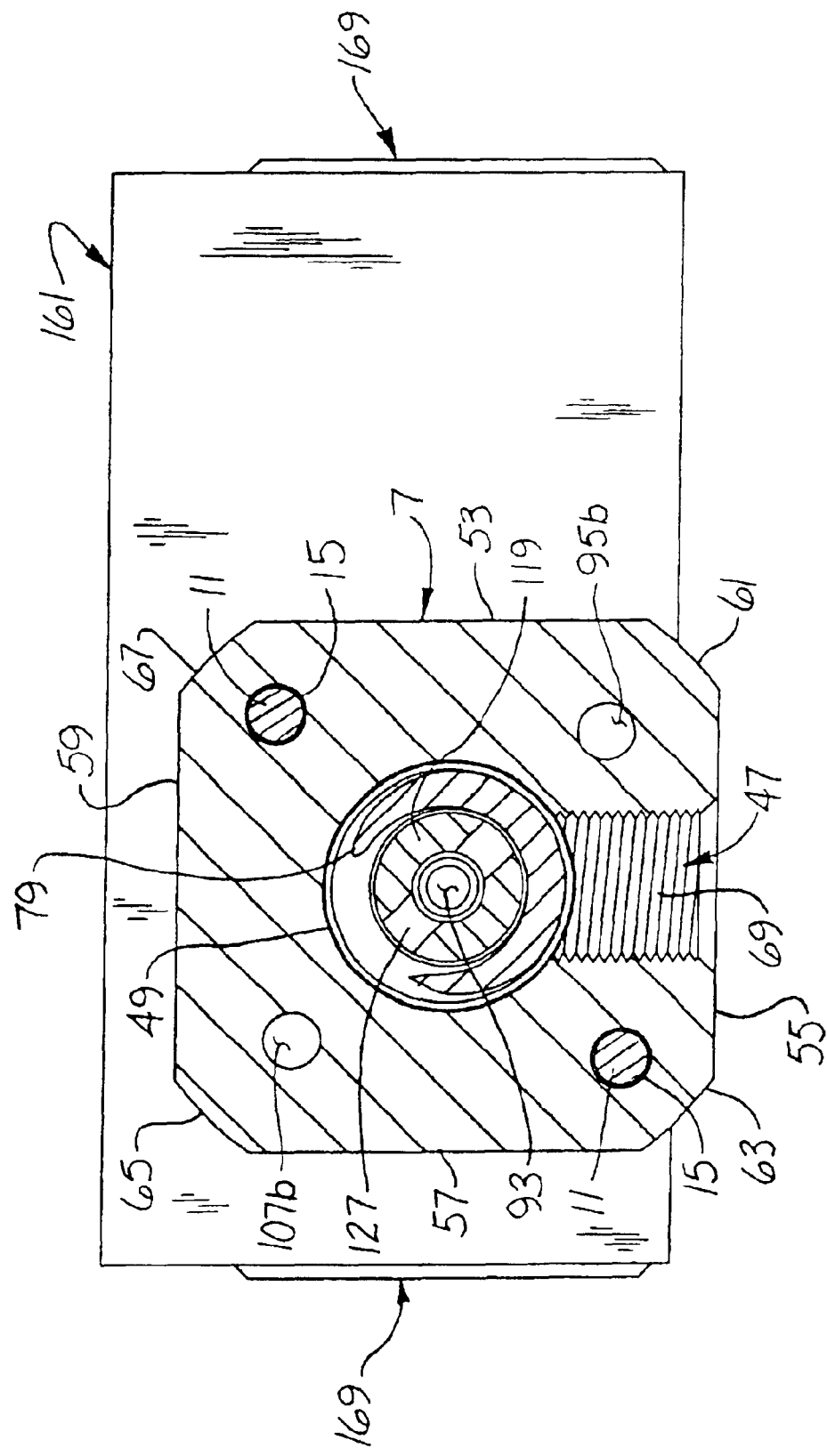

Auxiliary passage 73 may be termed pressure passaging in that it serves to supply lubricant under pressure to the pressure chamber 29. It comprises an elongate vertical passage 107 extending up in the body 3 from an angled passage 109 in the lower part 9 of the body extending through the lower part 9 from the inlet and in the upper part 7 to a horizontal (transverse) passage 111 in the upper part communicating with the pressure chamber 29. The auxiliary passage 73 establishes communication between the inlet 43 and the pressure chamber 29 during all phases of operation of the injector. The vertical passage 107 is formed by drilling a relatively short hole 107a in the lower body part 9 down from the upper end of part 9 and drilling a relatively long hole 107b in the upper body part 7 from the lower end of part 7 before assembly of the upper and lower parts, these holes being aligned in the assembly of the parts with an O-ring seal 113 at the junction of the parts. The passage 109 is drilled up from the inlet 43 to the lower end of passage 107a at an angle. The horizontal passage 111 (see also FIG. 8) is drilled in from bevel 65 intersecting the upper end of passage 107b and plugged at its outer end as indicated at 115.

In the stated first position of the valve 75 biased down to the lower limit of its stroke (FIGS. 4, 4A and 6), the annular groove 87 in the valve registers with passage 99 to establish communication between passages 95 and 43, passage 97 is blocked, the radial ports 91 in the valve are blocked, and the lower end of the valve projects down into the inlet 43 to some extent. In the stated second position of the valve (its raised position of FIGS. 5 and 6), passage 99 is blocked, the radial ports 91 register with passage 97, the lower end of the valve is somewhat up in the bore 81 and its upper end 83 is up in chamber 49.

At 117 (see FIG. 4A) is generally indicated an extension of the valve comprising a tubular fitting or socket 119 fitted on the reduced-diameter upper end 83 of the valve down against the shoulder 85 adjacent the upper end of the valve and a stem 121 of smaller diameter than the fitting or socket extending up from the upper end thereof, the fitting or socket having an upwardly facing shoulder 123 surrounding the lower end of the stem. The fitting or socket 119 has an outwardly extending flange 125 of slightly smaller external diameter than the internal diameter of the discharge chamber 49, this flange having the dual function of acting as a spring seat and like a piston in chamber 49. Radial ports 127 in the fitting or socket 119 extending outward from the socket-forming recess 129 in the fitting or socket at the level of the upper end of the reduced-diameter upper end 83 of the valve 75 provide for communication (exit) of lubricant from the axial passage 93 in the valve to the discharge chamber 49. The spring 77 is a coil compression spring housed in chamber 49 surrounding the stem 121 of the valve extension 117 and reacting from the upper end 51 of chamber 49 against the shoulder 123. The spring 79 is a coil compression spring longer than spring 77 surrounding spring 77 in chamber 49 and reacting from the upper end of the chamber against the flange (piston) 125. While two springs are used in this particular embodiment, more or less springs can be used without departing from the scope of this invention.

The plug 23 closing the upper end of the differential cylinder 5 has a lower cylindric section 131 threaded as indicated at 133 in the counterbore 21 with an O-ring seal at 135, a hexagonal head 137, and a tubular upper extension 139. The differential piston 25 has a pin 141 press-fitted in a hole 143 in the upper end of the piston 25 extending up through an axial opening 145 in section 131 of the plug 23 with a seal assembly 147 surrounding the pin in a counterbore 148 of the opening 145. The pin is slidable in a bore 149 in a stop 151 adjustably threaded as indicated at 153 in the tubular extension 139 of plug 23, the upper end of the pin being engageable with the head 155 of the stop. A lock nut 157 is threaded on the stop as indicated at 159, being backed off for adjustment of the stop to different positions determining different volumes for dispensing from measuring chamber 27, then tightened to maintain the volume setting.

Figure 4B:
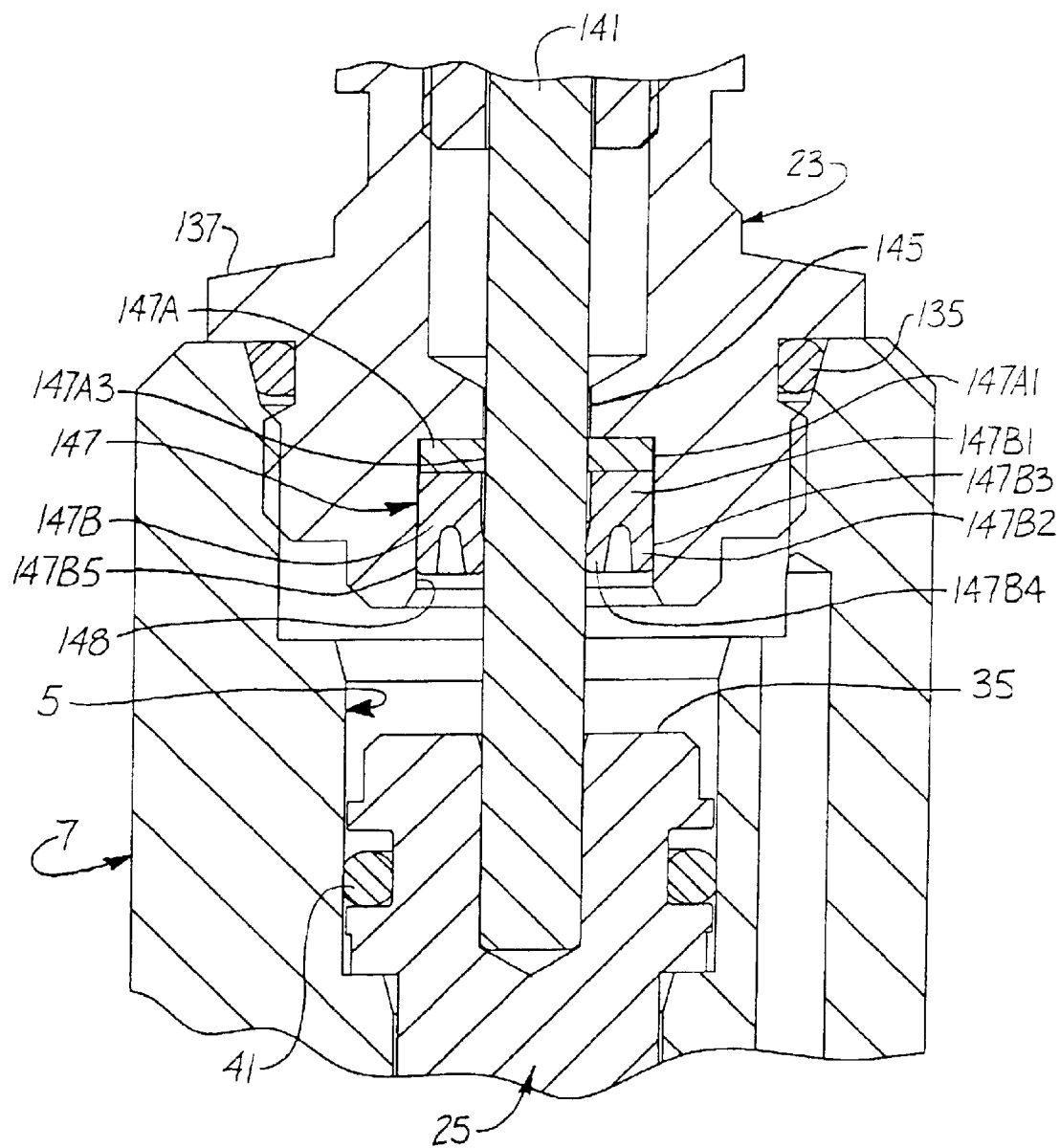
FIG. 4B is an enlarged fragment of FIG. 4 showing a sealing assembly.

In one embodiment, the seal assembly 147 comprises a first annular flat packing seal 147A made of nylon, for example, having an outer edge 147A1 in sealing contact with the wall of the counterbore 148 and an inner edge 147A3 the pin 141. This seal is effective for sealing at relatively low pressures (e.g., up to 800–1000 psi). The seal assembly 147 also includes a cup seal 147B which in one embodiment is made of 92 (±5) Shore A polyurethane effective for sealing at higher pressures (e.g., up to 10,000 psi). The cup seal 147B is disposed below the packing seal 147A and, as shown in FIG. 4B, includes an annular base 147B1 in face-to-face with the packing seal 147A, an outer rim 147B2 projecting down from the base and having an outer surface 147B3 in sealing contact with the wall of the counterbore 148, and an inner hub 147B4 spaced inward from the rim and having an inner surface 147B5 in sliding sealing contact with the pin 141. The packing seal 147A and the cup seal 147B are commercially available from Sealtite Corporation of St. Louis, Mo., for example. When used in combination, the two seals 147A and 147B function to effectively seal against the leakage of lubricant from the measuring chamber 27 at high and low pressures. The two seals 147A and 147B may be press fit in the counterbore 148.

As illustrated in FIG. 1, each of the four injectors 1 is mounted on a manifold M constituting a connector for connecting the injectors with a lubricant supply line (not shown) which supplies the injectors with lubricant under pressure in cycles and vents them of the lubricant under pressure. Each of FIGS. 3–7 illustrates one individual injector mounted on a connector 161 for a single injector. The manifold M comprises an elongate horizontally extending body of generally square cross-section (as appears in FIG. 1) having a top 163, bottom 165, sides 167 and a lubricant passage 169 extending longitudinally thereof between ports at each end, FIG. 1 showing port 170 at the right end. The body of the manifold is passaged similarly to the connector 161 shown in FIGS. 3–7, the connector 161 being shown as having a passage 169 corresponding to passage 169 of the manifold, the injector 1 being removably held thereon and in communication with passage 169 by means of a bolt 171 having a passaged shank 173 extending up through a lower hole 175, across the passage 169, through an upper hole 176 and removably threaded as indicated at 177 at its upper end in the injector inlet 43. The head 179 of the bolt engages the bottom of the connector with an annular seal as indicated at 180. This seal 180 may be a copper washer, for example. Radial ports 181 and an axial passage 183 in the bolt provide for communication between the passage 169 and the injector inlet 43. It will be understood that there are four bolts 171 in the manifold M, thus four inlets, one for each of the four injectors mounted on the manifold, whereas there is only one bolt in the connector 161. Otherwise they directly correspond.

Figure 12:
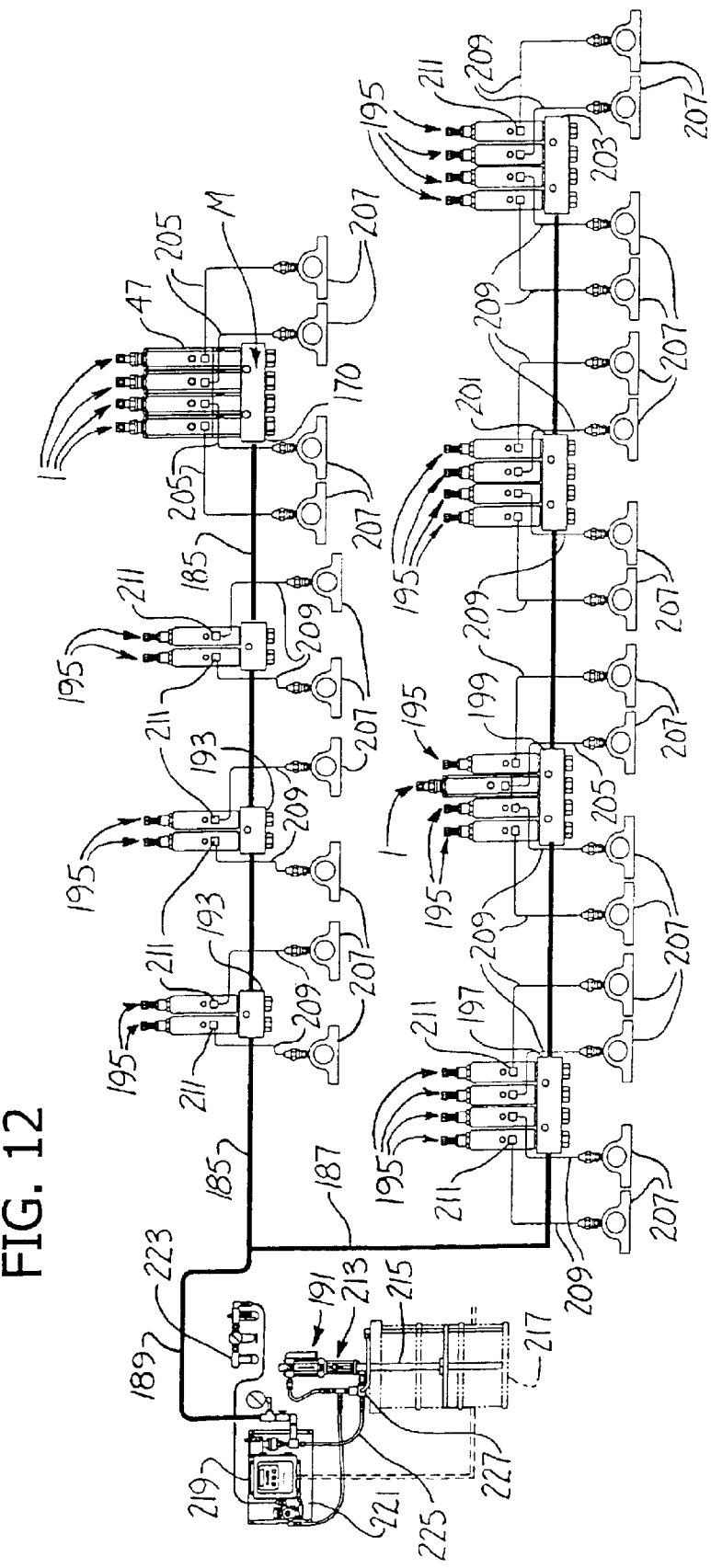
FIG. 12 is a diagrammatic view of a lubricant injector system incorporating a four-injector bank of injectors such as shown in FIG. 1, a single injector such as shown in FIG. 1 in a bank of prior injectors, certain prior injectors and two-injector banks of prior injectors.

FIG. 12 shows one possible centralized lubrication system of the invention having two branch lubricant lines 185 and 187 ("single lines") branching off from a main lubricant line 189 extending from apparatus indicated at 191 in its entirety. Apparatus 191 is operable in cycles for supplying lubricant under pressure to lines 189, 185, 187 and venting the lines following the supplying of the lines with the lubricant under pressure. At the end of line 185 is a manifold M with four injectors 1 of the invention, line 185 being connected to an inlet port 170 of the manifold (the distal end of the manifold being closed). The system also includes three manifolds, each designated 193 and each with two SL-1 injectors 195 thereon, connected in line 185 intermediate the supply line 189 and the manifold M. Line 187 has four manifolds 197, 199, 201, 203 connected therein, three of these (197, 201, 203) having four SL-1 injectors 195 thereon, and manifold 199 having three SL-1 injectors 195 and one injector 1 of this invention thereon. Each injector 1 has a lubricant line 205 connected to its lower outlet 47 and extending therefrom to a bearing 207 (or other part) to be lubricated, its upper outlet 45 being plugged. Each SL-1 injector 195 has a lubricant line 209 connected to its lower outlet 211 and extending to a bearing 207 (or other part to be lubricated), its upper outlet being plugged.

The apparatus indicated at 191 is of a known type comprising a lance pump 213 such as the pump sold by assignee under the trademark PowerMaster® having pump tube 215 extending down into a drum 217 of lubricant for pumping lubricant (e.g., oil, grease) from the drum to supply line 189 and branch lines 185, 187. It includes a controller 219, an air valve 221, an air inlet 223 and an associated outlet lubricant line 225, being of the type shown in the above-listed U.S. Pat. No. 2,328,812 which is incorporated herein by reference. This apparatus functions to pump lubricant under pressure through line 189 and branch lines 185, 187, and, after the pressure increases to a predetermined high limit sufficient to effect operation of the injectors to discharge lubricant to the bearings, vents the lines at least to some extent (i.e., relieves the pressure) back to the drum 217, as will be understood by those knowledgeable in this field. This pressure relief may be effected by operation of a conventional 3-way valve 227 which is operable to establish communication between the supply line 189 and the drum 217 which is at ambient pressure.

FIGS. 4 and 4A illustrate injector 1 in repose in its normal or at rest state, which the injector assumes on venting of the inlet 43 via passage 169 in the connector 161 (or manifold M) and lines 185 and 189 (for example). This is referred to as state 1. The injector is in this state at the start of each cycle of operation, with pressure of lubricant in the inlet relieved and with the measuring chamber 27 charged with lubricant. Valve 75 is down in its stated first position.

A cycle of operation starts when apparatus 191 inaugurates delivery of lubricant under pressure through lines 189, 185 and 187 to each injector 1 via the respective manifolds M and the injector inlets 43. The measuring chamber 27 of each injector is loaded with lubricant under pressure. The differential piston 25 is down in its retracted position in the differential cylinder 25 wherein the lower end of the upper part 33 of the differential piston engages the shoulder 24 at the junction of the upper and lower section of the differential cylinders, the lower end of the differential piston being just above the level of passage 111. The pressure chamber 29 is filled with lubricant under pressure corresponding to that in the measuring chamber via inlet 43, angled passage 109, and passages 107 and 111, but since the lower end 37 of the differential piston is of smaller area than its upper end 35, the downward force on the differential piston is greater than the upward force and it stays down.

Figure 5:
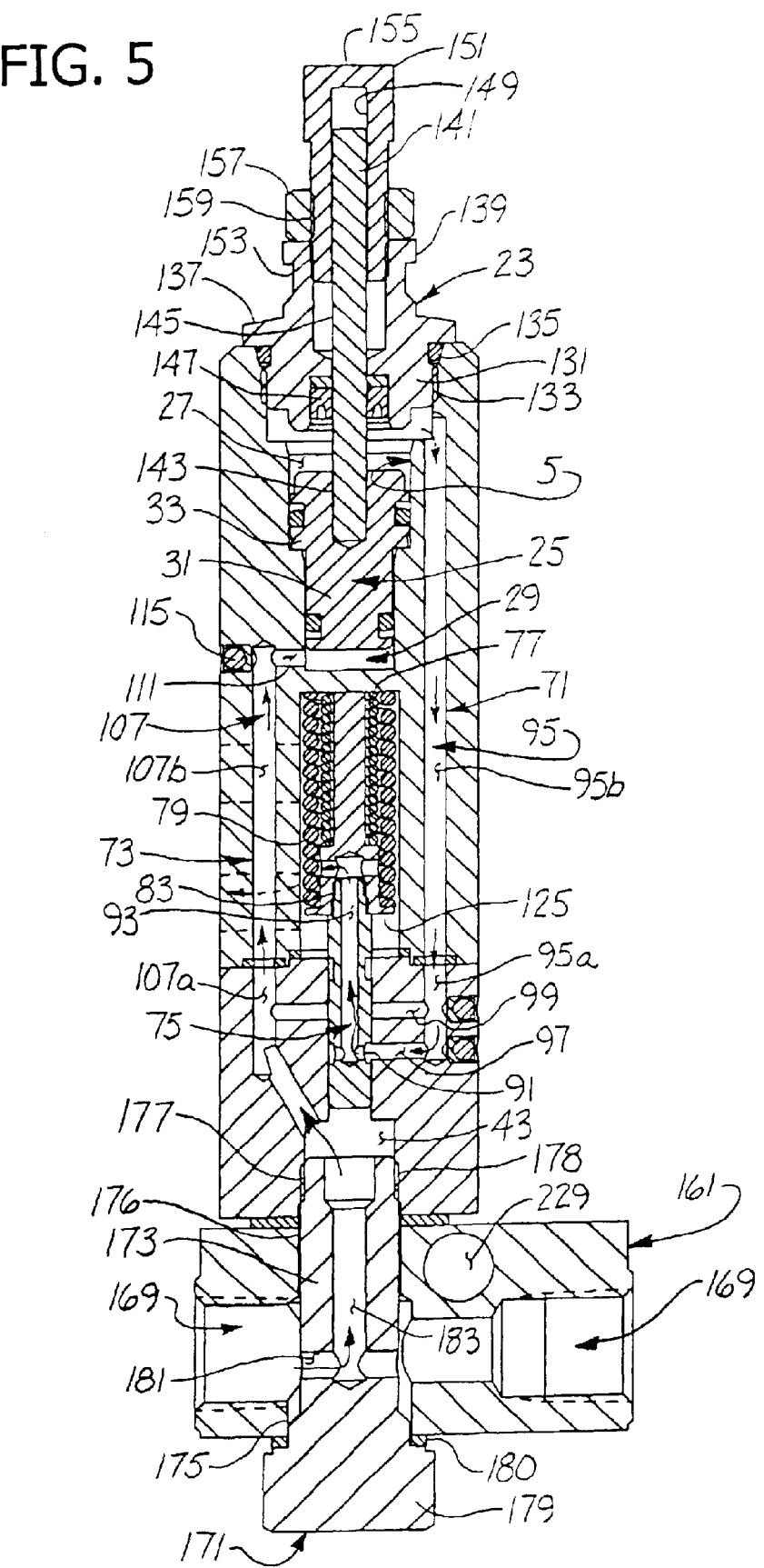
FIGS. 5, 6 and 7 are views of the injector in section like FIG. 4 showing the injector in second, third and fourth states, respectively.

On continued operation of the lubricant pump 213, the pressure of lubricant in line 189, lines 185 and 187 and each of the manifolds increases, and when the pressure reaches a predetermined value (e.g., greater than 1200 psig), the slide valve 75, having its lower end exposed to the increased pressure in the inlet 43, moves up (against the bias of springs 77 and 79 and any back pressure at the outlet 45) to its stated second position as shown in FIG. 5. This places the injector in what is referred to as state 2. The slide valve 75 in its raised (second) position now blocks the horizontal passage 99 and establishes communication between passage 97 and passage 93 in the valve via the annular groove 91 in the valve. Lubricant delivered under pressure to the pressure chamber 29 below the differential piston 25 via passages 107 and 111 now forces the piston through an upstroke to an upper limit determined by the upper end of pin 141 engaging the head 155 of the stop 151. A comparison of FIGS. 5 and 6, the latter showing the piston 25 at the upper limit of its stroke, exhibits this, FIG. 6 showing the injector in what is referred to as state 3.

On the upstroke of the differential piston 25, a measured volume of lubricant is forced out of the measuring chamber 27 down through passages 95b and 95a, then through passage 97, the radial ports 91 in the valve 75, up through the passage 93 in the valve, the discharge chamber 49, and out through outlet 47 (45 being plugged) and the respective line 205 to the respective bearing 207. The volume delivered during discharge is essentially equal to the displacement of the differential piston 25 in stroking upward (as determined by the setting of the stop 151), and may be varied by threading the stop in or out. The pressure at the outlet 47 of the injector during discharge is typically about 70% of the pressure at the inlet 43. By way of example, the pressure at the outlet during discharge may be in the range of 1,800–2,400 psig.

The differential piston 25 and the valve 75 remain in their state 3 (FIG. 6) position until pump 213 cycles off and lubricant pressure in the manifolds and the lubricant branch supply lines 185–187 is reduced by operation of valve 227 to vent the supply line 189 to the drum 217. As the pressure drops (e.g., to a level below 1200 psig), the slide valve 75 moves down back to its stated first position (wherein it also appears in FIG. 7), the injector then assuming what is referred to as its state 4 (FIG. 7) in which the injector is in a venting condition for recharging. Significantly, the slide valve 75 is biased back down toward its first position by two forces, first by springs 77 and 79, and second by back pressure of the lubricant at the outlet 45 and in the discharge chamber 49, the back pressure on the valve being due to the differential of surface area exposed to such back pressure. (It will be noted in this regard that, in the embodiment shown in FIG. 4A, the exposed surface area on the underside of the flange 125 is less than the combined exposed surface area of the top of the flange, the shoulder 123 on the fitting or socket 119 and the top of the stem 121.) The use of back pressure to urge the valve 75 toward its stated first position allows venting of the injector at higher inlet 45 pressures than the prior injectors (e.g., 1200 psig for injector 1 versus 600 psig and 200 psig for SL-1 and SL-32 injectors, respectively), thus reducing the required venting time needed to recharge the injector. The venting pressure of the injector 1 may be controlled by varying the spring force exerted on the slide valve 75. (Increasing the spring force will increase the venting pressure of the injector; decreasing the force will decrease the venting pressure.) It will be understood that means other than one or more springs can be used to urge the slide valve 75 toward its stated first position.

Back in its stated first position, the valve 75 establishes communication from inlet 43 via angled passage 109, passage 107a, passage 99 via the annular groove 87 in the valve, and up through passage 95 (95a and b) to the measuring chamber 27 (note the arrows in FIG. 7), thereby "venting" the injector. At the same time, lubricant pressure in measuring chamber 27 acting on the upper end of the differential piston 25 forces the piston down, forcing lubricant out of pressure chamber 29 through passage 111 and down passage 107 to passage 99, where it commingles with the upflow from 109 in passage 107. The volume in measuring chamber 27 being greater than the volume under the differential piston 25 in the pressure chamber 29, an additional volume of lubricant flows from the respective line 185, 187 through the manifold, angled passage 109, passages 107, 99 and 95 to the measuring chamber 27. This additional volume transmitted from the inlet 43 to the measuring chamber 27 causes the pressure to drop very quickly at the inlet 43 and in the supply line(s), which has attendant advantages which will be discussed. The cycle of operation of the injector 1 of the present invention ends (in state 4) with the valve 75 in its stated first position and with the measuring chamber charged for the next cycle. This condition is in contrast to prior designs (e.g., the SL-1 and SL-32 injectors) where the cycle of operation ends with the slide valve closing the passaging between the inlet and the measuring chamber and the measuring chamber empty.

The holes 229 shown in the manifold M and the corresponding single-injector connector 161 are for receiving fasteners (not shown) for attaching the manifold and connector to a vertical surface.

The injectors 1 on the four-injector manifold M in the centralized lubrication system shown in FIG. 12 have the salutary effect of reducing the time involved in the venting of line 185 and the injectors 195 in line 185 and line 189 in that the injectors 1 act, during venting and recharging, to relieve lubricant pressure on the injectors 195 in line 185 and in line 189 by venting lubricant therefrom into the measuring chambers 27 of the injectors 1 at the end of line 185, instead of doing all the venting back through line 185. Similarly, the use of the one injector 1 on manifold 199 in line 187 effects reduction in vent time of line 187 and the injectors 195 in line 187, again due to the fact that venting and recharging of the injector 1 draws lubricant from the region adjacent the inlet 43 to reduce the upstream pressure in the supply lines. This example demonstrates how an existing system can be revamped in accordance with this invention to improve its performance as to vent and recycle time by replacing one (or more) of the old injectors in a supply line with a new injector 1 of this invention.

Figure 13:
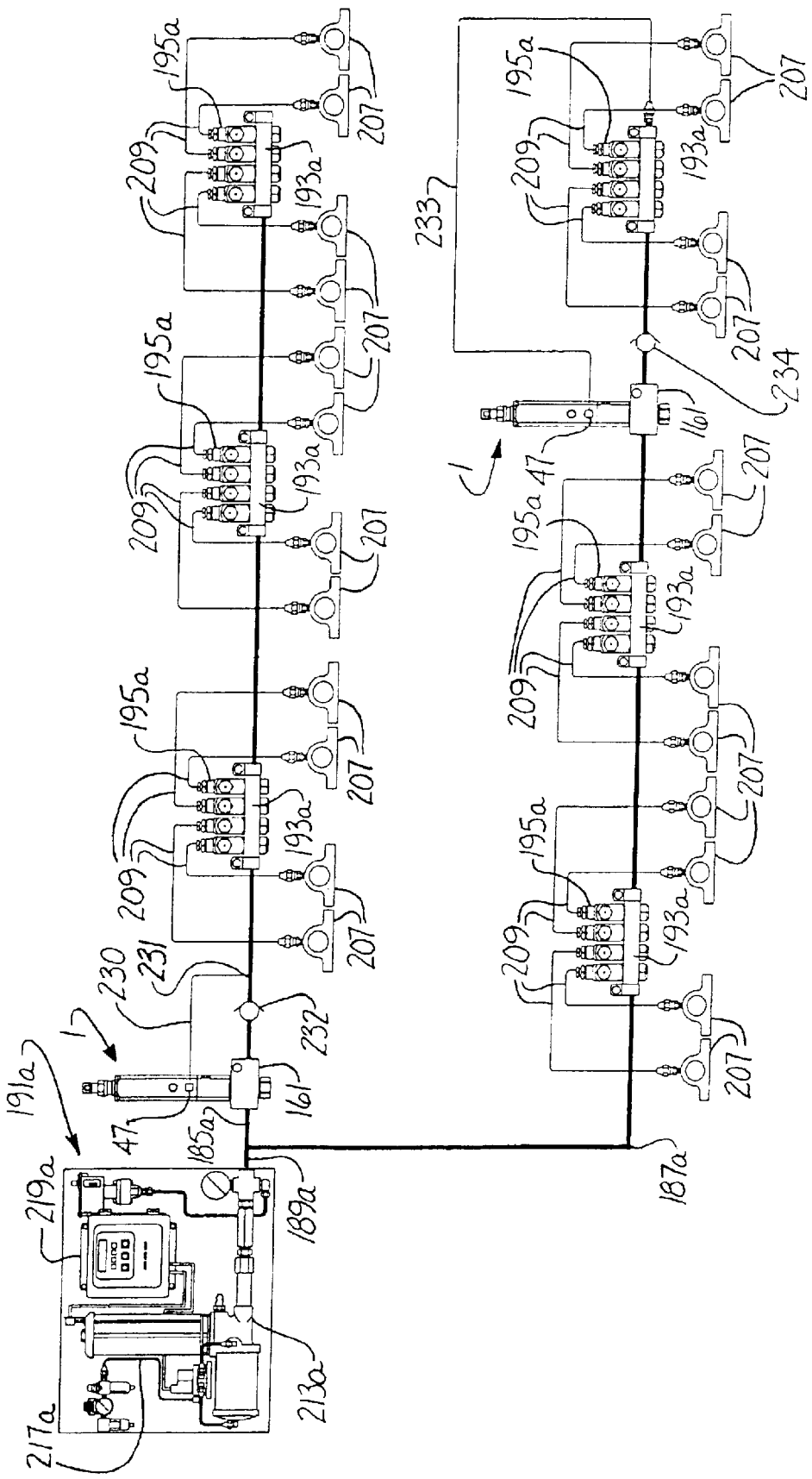
FIGS. 13 is a diagrammatic view of a lubricant injector system incorporating two injectors of this invention such as shown in FIGS. 1–11 and banks of four prior SL-32 injectors.

FIG. 13 shows another possible centralized lubrication system of the invention having the two branch lubricant supply lines 185a and 187a (again single lines) branching off from main line 189a extending from apparatus 191a which is of conventional design comprising a pump 213afor pumping lubricant under pressure from a supply source 217a and a control 219a and related components functioning like apparatus 191 previously described. Each line 185a, 187a has a plurality of manifolds 193a with a bank of four injectors 195a of a prior type thereon (e.g., SL-32 injectors), three of these banks being shown in each line. Each line 185a, 187a additionally has therein a connector 161 with one injector 1 of the invention thereon. Here the injectors 1 function to reduce vent time of all the injectors and lubricant lines and are provided solely for this purpose (not for feeding points of lubrication). The injector 1 in line 185a has its outlet 47 connected by a line 230 to line 185a at a juncture 231 downstream from the injector, a check valve 232 being provided in the line 185a between the injector 1 and this juncture. The injector 1 in line 187a has its outlet 47 connected by a line 233 to the end of the line 187a. A check valve 234 is provided in line 187a immediately downstream of the injector 1. The check valves 232, 234 remain closed during discharge of lubricant from the injectors 1 (to insure that there is a sufficient pressure differential to enable discharge of the injectors 1 through outlets 47) and open during venting of the injectors 1 to de-pressurize the lubricant lines supply lines 185a, 187a to permit faster venting of the conventional injectors 195a. While illustrated as being separate from the connectors 161, the check valves could be made integral with the connectors. It will be understood that the use of the injectors 1 to achieve faster venting of conventional injectors 195a could be in an initial installation or it may be a pre-existing system as to which the injectors 1 are added for enhancing the performance of the system, as above described.

Figure 14:
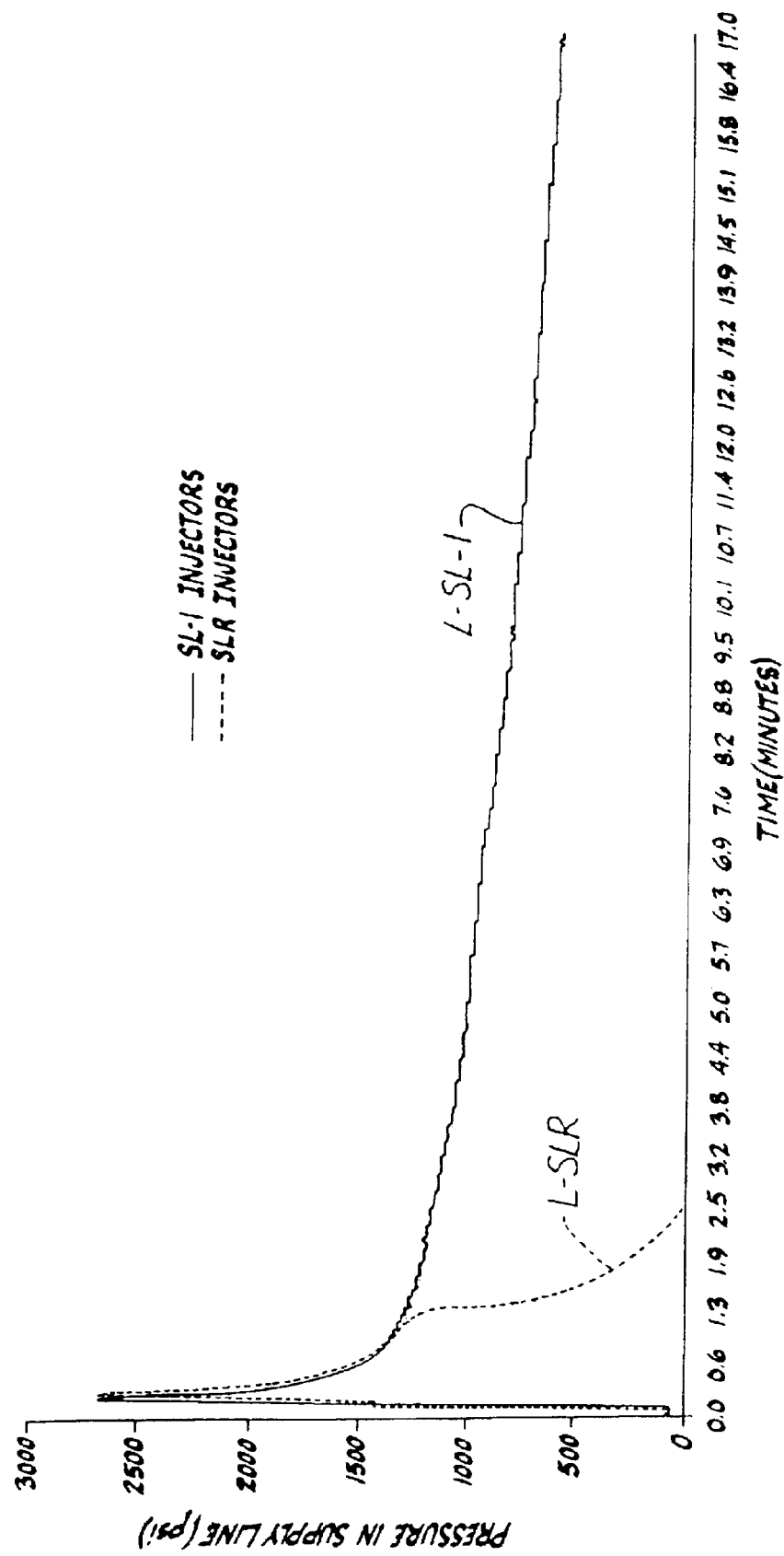
FIG. 14 is a graph comparing vent pressures and vent times of the injector of this invention shown in FIGS. 1–11 and a prior SL-1 injector.

FIG. 14 is a graph depicting supply line pressure/time functions of two lubrication systems, one including a bank of four SL-1 injectors and the other including a bank of four "SLR" injectors 1 of this invention, each having a lubricant supply line consisting of one hundred feet of one-quarter inch tubing, supplying NLG1#2 grease at 68° F. Supply line pressures are plotted as the ordinate, time (minutes) as the abscissa. Line L-SL-1 plots time vs. supply line pressure of the SL-1 injector; line L-SLR plots time vs. supply line pressure of the SLR injector (of this invention). It will be observed that, as to each system, supply line pressure increased from about zero to about 2600 p.s.i. in less than one minute, then decreased to about 1200 psig in about 3.8 minutes. At this point, in the system with the SLR injectors of this invention, supply line pressure dropped sharply down to about zero, meaning that the injectors vented at about 1200 psig in about 3.8 minutes from the start of the cycle. In contrast, supply line pressure for the SL-1 injectors continued far beyond 3.8 minutes, still decreasing below about 700 psig at 17.0 minutes, meaning that the venting pressure had not been reached after 17.0 minutes.

It will be observed from FIG. 14 that the pressure curve drops steeply from the maximum system pressure down to about 1200–1500 psi, at which point the curve levels off. Accordingly, there is a significant advantage to setting the venting pressure of the injector 1 at a pressure within this range, taking into consideration the required spring force on the slide valve 75 to achieve venting and the desired elapsed time required for venting, which are inversely related (that is, a shorter elapsed venting time requires a greater spring force on the slide valve 75.)

The ability of the injector 1 to vent at a higher inlet 43 pressures has several significant advantages. First, the recycle time of the injector is reduced substantially (as illustrated by the graph of FIG. 14), which allows lubricant to be delivered to a point of lubrication more frequently, which is preferred in most applications. In addition, the volume of lubricant recycled between the injectors and the lubricant source 217, 217a during each cycle of an injector 1 is reduced substantially. As a result, the supply line(s) can be of pipe or tubing of substantially smaller diameter, with attendant cost reduction. For example, whereas the prior SL-32 injector typically requires a 1.25 in.–1.50 in. diameter supply line, and the prior SL-1 injector typically requires a 0.75 in.–1.0 in. diameter supply line, the new injector 1 typically requires a supply line having a diameter of only 0.25 in.–0.375 in. Further, the workload of the pump is reduced for possible utilization of a smaller pump and/or longer pump life. Also, a smaller spring or springs can be used to urge the valve 75 toward its stated first position.

Figure 15:
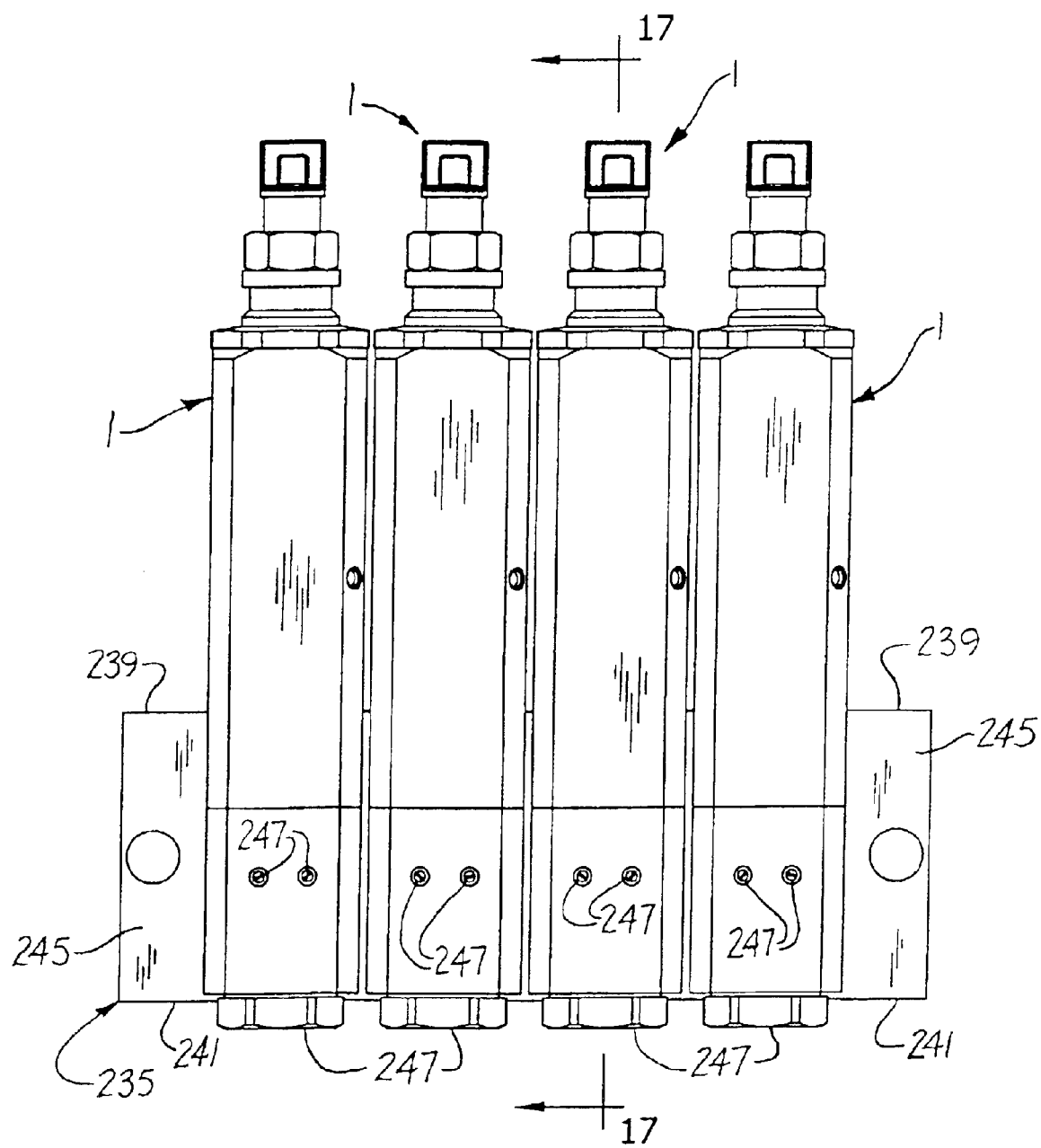
FIG. 15 is a view in elevation of an injector/manifold assembly of the invention enabling quick removal and reconnection as set forth above.
Figure 16:
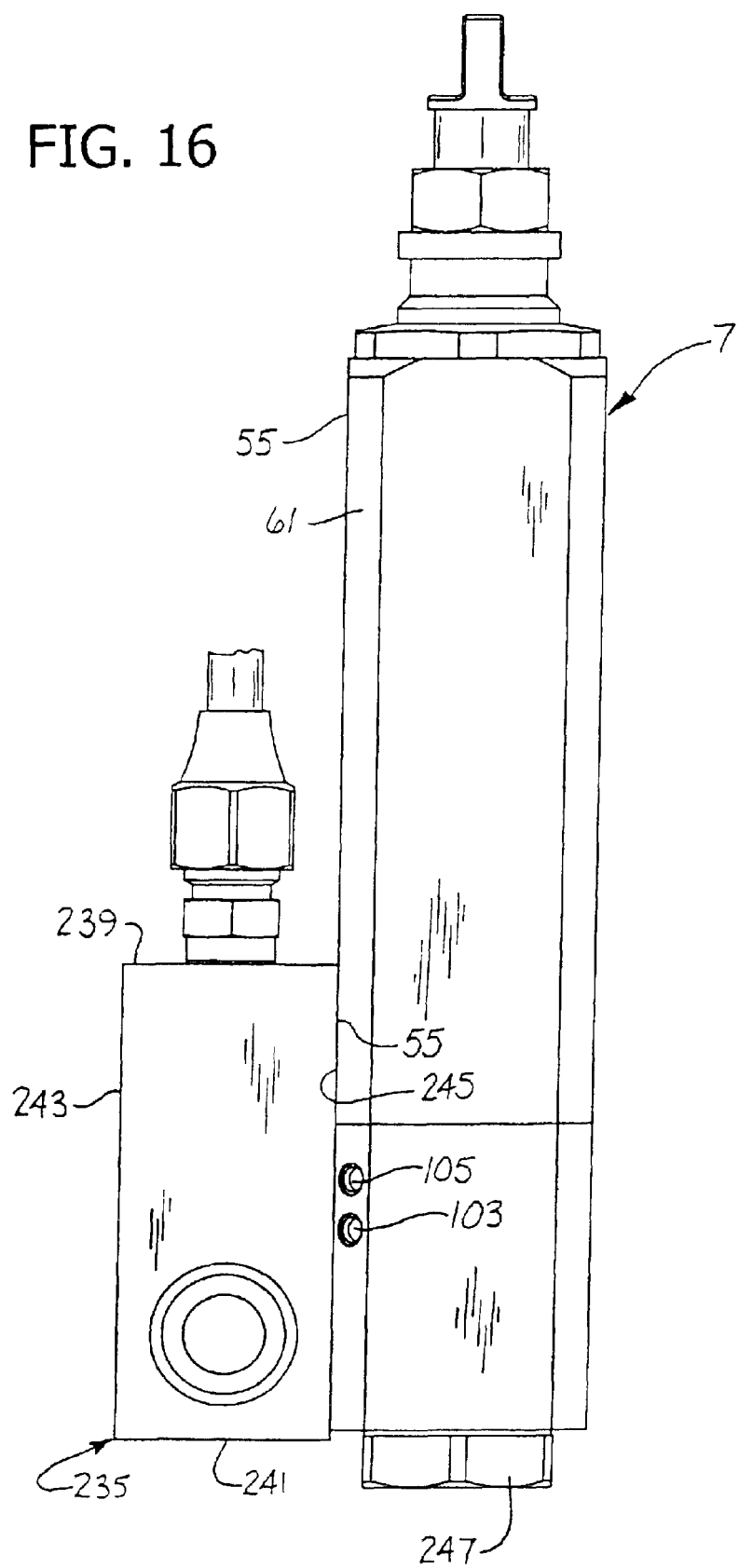
FIG. 16 is a view in elevation of the left end of FIG. 15.
Figure 17:
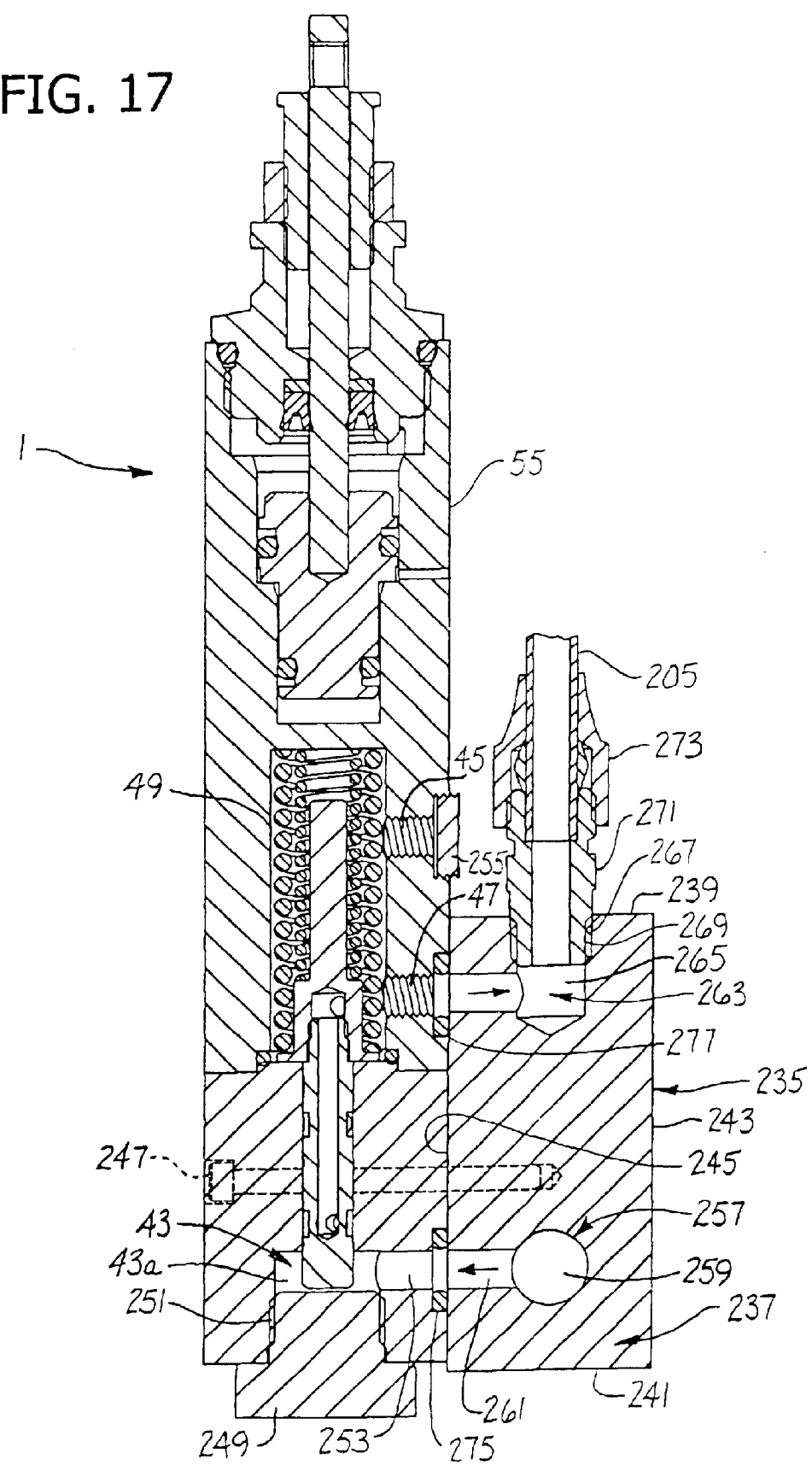
FIG. 17 is a vertical section on line 17—17 of FIG. 15.

FIGS. 15–17 illustrate a lubricant injector/connector assembly of the invention, specifically involving four lubricant injectors 1 and a four-injector manifold 235 as the connector. The manifold 235 (broadly the connector) comprises an elongate body 237, more particularly an elongate block of rectangular cross-section having a top 239, bottom 241, and rectangular side faces 243 and 245. Each injector 1 is detachably fastened as by screws 247 on face 245 of the manifold 235 with the face 55 of the body of each injector engaging face 245, the latter being termed the injector-engaging face of the manifold. The inlet 43 of each injector is closed by a plug 249 threaded up as indicated at 251 in the inlet bore (see FIG. 17), forming an inlet chamber 43a. Each injector 1 is specially formed with an inlet passage 253 extending from the face 55 of the injector body 3 to said inlet chamber 43a. The outlet passage 47 of the injector extends from the discharge chamber 49 within the injector body 3 to the face 55 of the injector intermediate the inlet passage 253 and the upper end of the injector body opposite the inlet end. The outlet 45 of the injector is plugged as indicated at 255 and out of use. The connector (manifold) body 237 has lubricant supply passaging generally designated 257 therein comprising a longitudinal passage 259 and lateral passages 261 (four for the four injectors) extending at right angles from the longitudinal passage 257 to the face 245 of the connector (manifold) body 237 in communication at faces 245 and 55 with the inlet passages 253 in the four injectors. The connector (manifold) body 237 further has four lubricant outlet passages each generally designated 263 therein, one for each of the four injectors. Each outlet passage 263 comprises a horizontal entry passage 265 extending in from side 245 of the connector (manifold) body 237 in communication at faces 55, 245 with the respective outlet passage 47 of the respective injector and an exit passage 267 extending up to the top 239 of the body 237. Threaded as indicated at 269 in each exit passage 267 is a tubular exit fitting 271 to which is attached as indicated at 273 a lubricant line such as line 205 for delivery of lubricant from the respective injector outlet 47 to a point of lubrication, such as a bearing 207. O-ring seals 275 are provided at the junctions of passages 261 and 263, and O-ring seals 277 are provided at the junctions of passages 47 and 265.

The lubricant supply passage 259 in the manifold 235 extends from one end thereof to the other. If the manifold is connected in a supply line, line connections are made at both ends. If the manifold is connected at the end of a supply line, a line connection is made at one end and the other end is plugged.

The lubricant injector/manifold assembly of FIGS. 15–17 enables any injector (detachably connected to the manifold by the screws 247) to be removed for inspection or replacement simply by removing the screws 247 without disturbing the respective lubricant delivery line 205. Thus, the removal and replacement of the injector may be accomplished without requiring disconnection of line 205 for its removal and without reconnection of line 205 following the assembly of the inspected or replacement injector with the manifold.

While the disclosure in FIGS. 15–17 is of four injectors on a four-injector manifold, it will be understood that the invention encompasses the assembly of one injector on a single-injector connector, and that the principle involved is applicable to assemblies of injectors other than the FIG. 1 injector 1 of this invention with a connector.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense. For example, separate passaging could be used for flow of lubricant to and from the measuring chamber 27. Also, the configurations of the various components of the injector and the configurations of the manifold/connectors may vary widely without departing from the scope of the present invention.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. The method of improving the performance of an existing lubrication system which comprises a plurality of injectors each operable through a cycle upon being supplied with lubricant under pressure to deliver a volume of lubricant and upon relief of pressure to recharge, a system for supplying the injectors with lubricant under pressure for delivery of said volume and for venting the injectors for recharging, said method comprising replacing one of said injectors with an injector comprising a body having an inlet for lubricant under pressure, an outlet, a measuring chamber for receiving lubricant from the inlet, a piston movable through a stroke in the measuring chamber for the discharge of a measured volume of lubricant from the measuring chamber and thence through the outlet, and a valve responsive to pressure conditions in the inlet for operation of the injector in cycles in each of which the injector starts in a state of repose wherein pressure of lubricant in the inlet is relieved and the measuring chamber is charged with lubricant, progresses through a state wherein lubricant under pressure is delivered to the injector via the inlet for the discharge, and ends in a state for venting the injector to effect recharging of the measuring chamber involving the transmission of lubricant from the inlet to the measuring chamber.

2. The method of improving the performance of an existing lubrication system which comprises a plurality of injectors each operable through a cycle upon being supplied with lubricant under pressure to deliver a volume of lubricant and upon relief of pressure to recharge, a system for supplying the injectors with lubricant under pressure for delivery of said volume and for venting the injectors for recharging, said method comprising replacing one of said injectors with an injector a body having an inlet for lubricant under pressure from a supply, an outlet, a measuring chamber for receiving lubricant from the inlet, a piston movable through a stroke in the measuring chamber for discharging a measured volume of lubricant therefrom, said injector having passaging for transmission of lubricant from the inlet to the measuring chamber and transmission of lubricant from the measuring chamber to the outlet, a valve movable between a first position for the transmission of lubricant from the inlet to the measuring chamber and blocking the transmission of lubricant from the measuring chamber to the outlet and a second position for blocking the transmission of lubricant from the inlet to the measuring chamber and for the transmission of lubricant from the measuring chamber to the outlet, said valve being biased to move from its second to its first position and responsive to certain pressure of lubricant in the inlet to overcome the bias and move from its first to its second position, said injector being operable in cycles each of which involves the injector initially being in a first state due to relief of pressure in the inlet, in which state the valve is in first position and the measuring chamber is charged with lubricant, the injector progressing to a second state on increase of pressure in the inlet sufficient to overcome the bias and move the valve to its second position, then progressing to a third state upon further increase in pressure in the inlet for discharging said volume, and finally a fourth state upon drop of pressure in the inlet wherein the valve is in its first position for venting the injector to effect recharging of the measuring chamber involving the transmission of lubricant from the inlet to the measuring chamber.

3. The method of improving the performance of an existing lubrication system which comprises a plurality of injectors each operable through a cycle upon being supplied with lubricant under pressure to deliver a volume of lubricant and upon relief of pressure to recharge, a system for supplying the injectors with lubricant under pressure for delivery of said volume and for venting the injectors for recharging, said method comprising replacing one of said injectors with an injector comprising a body having a differential cylinder therein, a differential piston slidable forward in the cylinder from a retracted position establishing a measuring chamber for a charge of lubricant on the forward side of the piston and a pressure chamber of smaller cross-sectional area than the measuring chamber on the rearward side of the piston, said piston being movable forward from retracted position through a stroke for discharging a measured volume of lubricant from the measuring chamber and rearward back to retracted position for the recharging of said measuring chamber, said injector being operable in cycles for discharging said measured volume on each cycle and then recharging said measuring chamber and holding the charge for the next cycle, said body having an inlet for lubricant under pressure, an outlet for the discharge, primary passaging for the transmission of lubricant under pressure from said measuring chamber to the outlet for the discharge of said volume and for transmission of lubricant under pressure from the inlet to the measuring chamber for the charging thereof with lubricant under pressure, said body further having auxiliary passaging for transmission of lubricant under pressure from the inlet to the pressure chamber and back from the pressure chamber, a valve movable in the body between a first position wherein it opens said primary passaging for charging said measuring chamber and blocks said primary passaging from discharging said volume and a second position wherein it blocks said primary passaging against recharging said measuring chamber and opens said primary passaging for discharge of said volume from said measuring chamber, said valve being biased to move from its second to its first position and being movable from its first to its second position in response to increase in the pressure of lubricant in the inlet, said injector being in a first state, namely, a state of repose, when inlet pressure is in relief, the valve being in its first position, the measuring chamber then holding a charge of lubricant under pressure and the differential piston being in retracted position, the pressure chamber being in communication with the inlet, a second state when inlet pressure increases sufficiently to overcome the valve bias and move the valve to second position, then progressing to a third state upon further increase in pressure in the inlet for discharging said measured volume, and finally a fourth state upon drop in pressure in the inlet wherein the valve is in its first position for venting the injector for the recharge of the measuring chamber involving the transmission of lubricant from the inlet to the measuring chamber.

4. The method of improving the performance of an existing lubrication system which comprises a plurality of injectors each operable through a cycle upon being supplied with lubricant under pressure to deliver a volume of lubricant and upon relief of pressure to recharge, a system for supplying the injectors with lubricant under pressure for delivery of said volume and for venting the injectors for recharging, said method comprising replacing one of said injectors with an injector comprising an elongate body having a longitudinal axis, a differential cylinder extending longitudinally of the body on said axis adjacent one end, said differential cylinder having first and second sections with the second section of smaller cross-sectional area than the first section and extending from the first section in the direction toward the other end of the body, a differential piston having first and second sections sealingly slidable in respective first and second sections of the differential cylinder, the first section of the cylinder providing a measuring chamber and the second providing a pressure chamber, an inlet in the other end of the body for the entry of lubricant under pressure from a supply line, an elongate discharge chamber in the body in line with the differential cylinder, an outlet extending from the discharge chamber, a bore extending from the discharge chamber to the inlet, a dual charging and discharging passage extending lengthwise in the body and communicating with the measuring chamber, a first transverse passage communicating with the dual passage and said bore, a second transverse passage communicating with the dual passage and said bore, a second lengthwise passage extending from the inlet to the pressure chamber and communicating with said second transverse passage, a slide valve slidable in the bore subject to pressure of lubricant in the inlet, said slide valve having a passage therein extending to said discharge chamber and being slidable between first and second positions, said slide valve being formed for blocking said first transverse passage and establishing communication between said second lengthwise passage and the dual passage in the first position and blocking said second transverse passage and establishing communication between the first transverse passage and the passage in the valve in the second position, at least one coil compression spring in said discharge chamber biasing the valve to move from second to first position, the valve being movable by pressure in the inlet from its first to its second position.

\* \* \* \* \*